(12) United States Patent
Joseph et al.

(10) Patent No.: US 11,783,321 B2
(45) Date of Patent: Oct. 10, 2023

(54) COMPUTER-IMPLEMENTED SYSTEM AND METHOD FOR PERFORMING TRANSACTION MIXING ON A BLOCKCHAIN

(71) Applicant: nChan Licensing AG, Zug (CH)

(72) Inventors: Daniel Joseph, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 360 days.

(21) Appl. No.: 16/606,203

(22) PCT Filed: Apr. 11, 2018

(86) PCT No.: PCT/IB2018/052530
§ 371 (c)(1),
(2) Date: Oct. 17, 2019

(87) PCT Pub. No.: WO2018/193341
PCT Pub. Date: Oct. 25, 2018

(65) Prior Publication Data
US 2020/0126070 A1    Apr. 23, 2020

(30) Foreign Application Priority Data
Apr. 18, 2017    (GB) ..................... 1706071

(51) Int. Cl.
*G06Q 20/36*    (2012.01)
*G06Q 20/06*    (2012.01)
(Continued)

(52) U.S. Cl.
CPC ..... *G06Q 20/3678* (2013.01); *G06Q 20/0658* (2013.01); *G06Q 20/3674* (2013.01); *G06Q 20/405* (2013.01); *H04L 9/0637* (2013.01)

(58) Field of Classification Search
CPC .......... G06Q 20/3678; G06Q 20/0658; G06Q 20/3674; G06Q 20/405; H04L 9/0637
See application file for complete search history.

(56) References Cited

U.S. PATENT DOCUMENTS 11,282,139 B1 * 3/2022 Winklevoss ........... G06Q 40/04
2016/0300227 A1 * 10/2016 Subhedar ............ H04L 63/1408
(Continued)

FOREIGN PATENT DOCUMENTS

JP    2013003777 A    1/2013
KR    20090024182 A    3/2009
(Continued)

OTHER PUBLICATIONS

Bonneau, J., Narayanan, A., Miller, A., Clark, J., Kroll, J. A., & Felten, E. W. (2014). Mixcoin: Anonymity for bitcoin with accountable mixes. In R. Safavi-Naini, & N. Christin (Eds.), Financial Cryptography and Data Security—18th International Conference, FC 2014, Revised Selected Papers (Year: 2014).*
(Continued)

*Primary Examiner* — Jacob C. Coppola
*Assistant Examiner* — Terry Nathan Murray
(74) *Attorney, Agent, or Firm* — Davis Wright Tremaine LLP

(57) ABSTRACT

A system for performing transaction mixing between a plurality of users on a blockchain is provided. The blockchain may be, for example, the Bitcoin blockchain. The system is configured to carry out the steps of: (i) preparing a first commitment transaction arranged to transmit control of a resource from a source address of a first user to a receiving address of a second user; (ii) preparing a second commitment transaction arranged to transmit control of a resource from a source address of the second user to a receiving address of a further user; (iii) preparing a further
(Continued)

commitment transaction arranged to transmit control of a resource from a source address of the further user to either: (a) a receiving address of the first user; or (b) a receiving address of a yet further user and repeating step (iii) until option (a) is performed to complete a transaction chain; and (iv) executing the transaction chain. At least one of the users is randomly chosen from the plurality.

11 Claims, 20 Drawing Sheets

(51) Int. Cl.
  *G06Q 20/40* (2012.01)
  *H04L 9/06* (2006.01)

(56) References Cited

U.S. PATENT DOCUMENTS

| | | | | |
|---|---|---|---|---|
| 2017/0187535 | A1* | 6/2017 | Middleton | G06Q 20/02 |
| 2018/0331832 | A1* | 11/2018 | Pulsifer | H04L 9/0637 |
| 2019/0182035 | A1* | 6/2019 | Chari | H04L 9/0894 |

FOREIGN PATENT DOCUMENTS

| | | |
|---|---|---|
| KR | 20160095720 A | 8/2016 |
| KR | 101723405 B1 | 4/2017 |
| WO | 2015171580 A1 | 11/2015 |
| WO | 2016170538 A1 | 10/2016 |

OTHER PUBLICATIONS

ShenTu, QingChun, and JianPing Yu. "A blind-mixing scheme for bitcoin based on an elliptic curve cryptography blind digital signature algorithm." arXiv preprint arXiv:1510.05833 (2015). (Year: 2015).*
Tim Ruffing et al: "P2P Mixing and Unlinkable Bitcoin Transactions", International Association for Cryptologic Research,, vol. 20160830:205548, Aug. 24, 2016 (Aug. 24, 2016), pp. 1-15, XP061021658 (Year: 2016).*
Tim Ruffing et al: Mixing Confidential Transactions: Comprehensive Transaction Privacy for Bitcoin, International Association for Cryptologic Research,, vol. 20170311:144840, Mar. 9, 2017 (Mar. 9, 2017), pp. 1-22, XP061022950, (Year: 2017).*
Barber, Simon, Boyen, Xavier, Shi, Elaine, & Uzun, Ersin(2012) Bitter to better—how to make bitcoin a better currency. In Keromytis, A D (Ed.) Financial Cryptography and Data Security: 16th International Conference, FC 2012 Revised Selected Paper (Year: 2012).*
Ruffing, Tim, Mixing Confidential Transactions, Comprehensive Transaction Privace for Bitcoin, 2017 (Year: 2017).*
Ruffing, Tim, P2p Mixing and Unlinkable Bitcoin Transactions, 2016 (Year: 2016).*
Heilman, Ethan, Tumble Bit, An Untrusted Tumbler for Bitcoin Anonymous Payments, 2016 (Year: 2016).*
Anonymous, Atomic Cross-Chain Technology, Bitcoin Wiki, 2016 (Year: 2016).*
Anonymous, "Atomic Cross-Chain Trading—Bitcoin Wiki," retrieved from https://en.bitcoin.it/w/index.php?title=Atomic_cross-chain_trading&oldid=47993, Jun. 8, 2014, 4 pages.
Antonopoulos, "Mastering Bitcoin—Unlocking Digital Cryptocurrencies," O'Reilly Media, Inc., Dec. 20, 2014, 282 pages.
Bitcoin Wiki, "Hashed Timelock Contracts," retrieved from https://en.bitcoin.it/wiki/Hashed_Timelock_Contracts, 2016, 2 pages.
Decker et al., "A Fast and Scalable Payment Network with Bitcoin Duplex Micropayment Channels," Symposium on Self-Stabilizing Systems, Aug. 18, 2015, 16 pages.
Heilman et al., "TumbleBit: An Untrusted Tumbler for Bitcoin-Compatible Anonymous Payments," International Association for Cryptologic Research, Jun. 3, 2016, 14 pages.
International Search Report and Written Opinion dated Jun. 28, 2018, Patent Application No. PCT/IB2018/052530, 26 pages.
Kumaresan et al., "How to Use Bitcoin to Incentivize Correct Computations," retrieved from https://people.csail.mit.edu/ranjit/papers/incentives.pdf, Nov. 2014, 12 pages.
Mukhamedov et al., "Analysis of a Multi-Party Fair Exchange Protocol and Formal Proof of Correctness in the Strand Space Model," retrieved from http://www.lsv.fr/Publis/PAPERS/PDF/MKR-fcrypto05.pdf, Mar. 2005, 15 pages.
Nakamoto, "Bitcoin: A Peer-to-Peer Electronic Cash System," Bitcoin, Oct. 31, 2008, https://bitcoin.org/bitcoin.pdf, 9 pages.
Patejl, "Jumblr—Decentralized Bitcoin Mixer with 0.1% Fee," retrieved from https://bitcointalk.org/index.php?topic=1179305.20, Sep. 2015, 6 pages.
Satoshi et al., "Connection Limits," Bitcoin Forum, Aug. 9, 2010, https://bitcointalk.org/index.php?topic=741.0;prev_next=prev, 2 pages.
Shentu et al., "Research on Anonymization and De-anonymization in the Bitcoin System," retrieved from https://arxiv.org/ftp/arxiv/papers/1510/1510.07782.pdf, Oct. 2015, 14 pages.
UK Commercial Search Report dated Apr. 28, 2017, Patent Application No. GB1706071.6, 6 pages.
UK IPO Search Report dated Sep. 22, 2017, Patent Application No. GB1706071.6, 9 pages.
Wilkinson, "Introduction to Micropayment Channels," retrieved from http://super3.org/introduction-to-micropayment-channels/, Apr. 13, 2016, 4 pages.
Yang et al., "Secure multiparty Bitcoin anonymization," retrieved from http://blog.ezyang.com/2012/07/secure-multiparty-bitcoin-anonymization/, Jul. 2012, 6 pages.
Maxwell et al., "CoinSwap: Transaction graph disjoint trustless trading," Bitcoin Forum, Oct. 30, 2013, https://bitcointalk.org/index.php?topic=321228.0;all, 21 pages.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.

* cited by examiner

| Action | Criteria | nLock Time | Further |
|---|---|---|---|
| A creates TX1: Pay $w$ BTC to <B's public key> | if ($x$ for $H(x)$ known and signed by B) or (signed by A & B) | | |
| A creates TX2: Pay $w$ BTC from TX1 to <A's public key> | | 48 hrs | signed by A |
| A sends TX2 to B | | | |
| B signs TX2 and returns to A | | | |
| 1) A submits TX1 to the network | | | |
| B creates TX3: Pay $v$ alt-coins to <A-public-key> | if ($x$ for $H(x)$ known and signed by A) or (signed by A & B) | | |
| B creates TX4: Pay $v$ alt-coins from TX3 to <B's public key> | | 24 hrs | signed by B |
| B sends TX4 to A | | | |
| A signs TX4 and sends back to B | | | |
| 2) B submits TX3 to the network | | | |
| 3) A spends TX3 giving $x$ | | | |
| 4) B spends TX1 using $x$ | | | |

Figure 2

| $T_c: U_i \rightarrow U_{(i+1) \bmod n}$ | |
|---|---|
| 100 | Transaction-ID |
| Version Number | Version number |
| <#> | Number of inputs |
| <Ref> | Prev Trans Output |
| <#> | Prev Trans Output index |
| Script length | Script length |
| <Script> | ScriptSig |
| <ScriptSignatureFlags> | ScriptSig |
| Sequence number | Sequence number |
| <#> | Number of Outputs |
| xBTC | Output value |
| Output Script Length | Output script length |
| redeemScript:<br>OP_IF<br>   OP_2 <pubkey $U_i$> <pubkey $U_{(i+1) \bmod n}$> OP_2<br>OP_CHECKMULTISIG<br>OP_ELSE<br>   OP_HASH160 <H(k)> OP_EQUALVERIFY <pubkey $U_{(i+1) \bmod n}$><br>OP_CHECKSIG<br>OP_ENDIF<br>scriptPupkey:<br>OP_HASH160 <H(redeemScript)> OP_EQUAL | Output script |
| LockTime | LockTime |

Figure 6

| | |
|---|---|
| $T_{r,0}: U_i \rightarrow U_{(i+1) \bmod n}$ | |
| <ID> | Transaction-ID |
| Version Number | Version number |
| <#> | Number of inputs |
| 100 | Prev Trans ID |
| 0 | Prev Trans Output index |
| Script length | Script length |
| OP_0 <sig $U_i$> <sig $U_{(i+1) \bmod n}$> OP_TRUE <$T_c$ redeemScript> | ScriptSig |
| <ScriptSignatureFlags> | ScriptSig |
| Sequence number | Sequence number |
| <#> | Number of Outputs |
| xBTC | Output value |
| Output Script Length | Output script length |
| OP_DUP OP_HASH160 < $H(\text{pubkey } U_i)$ > OP_EQUALVERIFY OP_CHECKSIG | Output script |
| $S + (n - i + 1)s$ | LockTime |

Figure 7

| | |
|---|---|
| $T_{Pay}: U_i \rightarrow U_{(i+1) \bmod n}$ | |
| <ID> | Transaction-ID |
| Version Number | Version number |
| <#> | Number of inputs |
| 100 | Prev Trans ID |
| 0 | Prev Trans Output index |
| Script length | Script length |
| `<sig `$U_{(i+1) \bmod n}$`> <k> OP_FALSE <`$T_c$` redeemScript>` | ScriptSig |
| <ScriptSignatureFlags> | ScriptSig |
| Sequence number | Sequence number |
| <#> | Number of Outputs |
| xBTC | Output value |
| Output Script Length | Output script length |
| `OP_DUP OP_HASH160 < `$H(\text{pubkey } U_{(i+1) \bmod n})$` >`<br>`OP_EQUALVERIFY OP_CHECKSIG` | Output script |
| LockTime | LockTime |

Figure 8

| $T_c: U_i \rightarrow U_{(i+1) \bmod n}$ | |
|---|---|
| 100 | Transaction-ID |
| Version Number | Version number |
| <#> | Number of inputs |
| <Ref> | Prev Trans Output |
| <#> | Prev Trans Output index |
| Script length | Script length |
| <Script> | ScriptSig |
| <ScriptSignatureFlags> | ScriptSig |
| Sequence number | Sequence number |
| <#> | Number of Outputs |
| $x$BTC | Output value |
| Output Script Length | Output script length |
| redeemScript:<br>OP_IF<br>    OP_2 <pubkey $U_i$> <pubkey $U_{(i+1) \bmod n}$> OP_2<br>OP_CHECKMULTISIG<br>OP_ELSE<br>   <basepoint G> OP_ECPMULT <$Q_{(i+1) \bmod n}$> OP_EQUALVERIFY<br><pubkey $U_{(i+1) \bmod n}$> OP_CHECKSIG<br>OP_ENDIF<br>scriptPupkey:<br>OP_HASH160 <$H(redeemScript)$> OP_EQUAL | Output script |
| LockTime | LockTime |

Figure 21

| $T_{r,0}: U_i \rightarrow U_{(i+1) \bmod n}$ ||
|---|---|
| <ID> | Transaction-ID |
| Version Number | Version number |
| <#> | Number of inputs |
| 100 | Prev Trans ID |
| 0 | Prev Trans Output index |
| Script length | Script length |
| `OP_0 <sig `$U_i$`> <sig `$U_{(i+1) \bmod n}$`> OP_TRUE <`$T_c$` redeemScript>` | ScriptSig |
| <ScriptSignatureFlags> | ScriptSig |
| Sequence number | Sequence number |
| <#> | Number of Outputs |
| $x$BTC | Output value |
| Output Script Length | Output script length |
| `OP_DUP OP_HASH160 < `$H(\text{pubkey } U_i)$` >`<br>`OP_EQUALVERIFY OP_CHECKSIG` | Output script |
| $S + (n-i)s$ | LockTime |

Figure 22

| $T_{Pay}: U_i \rightarrow U_{(i+1) \bmod n}$ | |
|---|---|
| <ID> | Transaction-ID |
| Version Number | Version number |
| <#> | Number of inputs |
| 100 | Prev Trans ID |
| 0 | Prev Trans Output index |
| Script length | Script length |
| <sig $U_{(i+1) \bmod n}$> <$sv_{(i+1) \bmod n}$> <$T_c$ redeemScript> | ScriptSig |
| <ScriptSignatureFlags> | ScriptSig |
| Sequence number | Sequence number |
| <#> | Number of Outputs |
| xBTC | Output value |
| Output Script Length | Output script length |
| OP_DUP OP_HASH160 < $H(\text{pubkey } U_{(i+1) \bmod n})$ > OP_EQUALVERIFY OP_CHECKSIG | Output script |
| LockTime | LockTime |

Figure 23

| <scriptSig> $T_{Pay}$ | <scriptPubkey> $T_c$ | Combined (r_hash) STACKED | Combined (r_pure) STACKED |
|---|---|---|---|
| <sig $U_{(i+1) \bmod n}$><br><br><$sv_{(i+1) \bmod n}$><br><br><$T_c$ redeemScript> | Redeem Pure<br><br><basepoint G><br><br>OP_ECPMULT<br><br><$Q_{(i+1) \bmod n}$><br><br>OP_EQUALVERIFY<br><br><pubkey $U_{(i+1) \bmod n}$><br><br>OP_CHECKSIG<br><br>Redeem Hash<br><br>OP_HASH160<br><br><H(redeemScript) ><br><br>OP_EQUAL | OP_EQUAL<br><br><H(redeemScript) ><br><br>OP_HASH160<br><br><$T_c$ redeemScript><br><br><$sv_{(i+1) \bmod n}$><br><br><sig $U_{(i+1) \bmod n}$> | OP_CHECKSIG<br><br><pubkey $U_{(i+1) \bmod n}$><br><br>OP_EQUALVERIFY<br><br><$Q_{(i+1) \bmod n}$><br><br>OP_ECPMULT<br><br><basepoint G><br><br><$sv_{(i+1) \bmod n}$><br><br><sig $U_{(i+1) \bmod n}$> |

Figure 24

COMPUTER-IMPLEMENTED SYSTEM AND METHOD FOR PERFORMING TRANSACTION MIXING ON A BLOCKCHAIN

FIELD OF INVENTION

This invention relates generally to blockchain transactions, and more particularly to the exchange of blockchain transactions within a group containing three or more users. The invention is particularly suited, but not limited, to use with the Bitcoin (BTC) blockchain.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger which is implemented as a computer-based decentralised, distributed system made up of blocks which in turn are made up of transactions. Each transaction is a data structure that encodes the transfer of control of a digital asset between users in the blockchain system, and includes at least one input and at least one output. Each block contains a hash of the previous block and the blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be: i) validated by the first node that receives the transaction if the transaction is validated, the node relays it to the other nodes in the network; ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

Blockchains which provide an open, public ledger make available to any interested parties the ability to trace the movement of specific digital coins, digital assets, or control of digital resources across a sequence of addresses. For example, Bitcoin's effectiveness and success as a currency is tied to the real and perceived fungibility of bitcoins, fungibility being the interchangeability property of a unit of a good with other unit goods of the same type (http://www.investopedia.com/terms/f/fungibility.asp). While the ledger being open and distributed is useful in acting as a means to trust the system, the ability it gives for tracking transactions across addresses allows for digital assets related to specific historical transactions to be analysed and correlated. To address Bitcoin fungibility, security and anonymization solutions have been developed. This can be useful as many real-world commercial transactions are confidential in nature, either for legal reasons, commercial reasons, or both. Accordingly, blockchain systems must be capable of ensuring both security and confidentiality for such commercial transactions despite the public nature of the blockchain.

Research in Bitcoin anonymity has included the development of alt-coins such as ZeroCash (Ben-Sasson, E., et al. (2014), "Zerocash: Decentralized Anonymous Payments from . . . ", http://zerocash-project.org/media/pdf/zerocash-oakland2014.pdf) and Monero (Mackenzie, A., Noether, S., et al. (2015), "Improving Obfuscation in . . . ", https://lab.getmonero.org/pubs/MRL-0004.pdf"). Likewise, Bitcoin-compatible solutions have been developed. Of these compatible solutions, coin mixing and associated variations are the most common, however other inventive anonymisation techniques exist, such as TumbleBit (Heilman, E., Alshenibr, L., Baldimtsi, F., Scafuro, A. and Goldberg, S., 2016. TumbleBit: An untrusted Bitcoin-compatible anonymous payment hub. Cryptology ePrint Archive, Report 2016/575; https://eprint.iacr.org/2016/575.pdf) and the use of Stealth Addresses (Franco, P., (2014), "Understanding Bitcoin: Cryptography . . . ", http://eu.wiley.com/WileyCDA/WileyTitle/productCd-1119019168.html). What all these solutions have in common are measures to disassociate users from specific Bitcoin transactions and addresses (where the user is either payer or where the user is the payee).

In the case of coin mixing solutions, the user inputs bitcoins into a service and their bitcoins are transferred to an output address of the user's choosing. The funds having been pooled before they are sent to the output addresses makes it difficult to ascertain which of the output addresses belongs to the user.

SUMMARY OF INVENTION

The present inventors have identified several technical and security related problems with the blockchain transaction mixing approaches described in the background section. Such transaction mixing approaches require a mixing service provider. This introduces an additional resource requirement into the system and additional management overhead for provision of this centralized transaction mixing service provider. Furthermore, the provision of a central transaction mixing service provider dilutes or compromises the decentralized, peer-to-peer architecture of a blockchain system. Such a centralized system removes control from the users. Furthermore, such a centralized system provides a focal point in the system for attack. Further still, the transaction mixing service provider may steal a user's digital assets from the pool or reveal to external parties the links between input addresses and output addresses, either intentionally or unintentionally, thus reducing security and confidentiality. In many ways, the provision of a centralized transaction mixing service provider compromises the fundamental ethos of a decentralized, peer-to-peer blockchain system which is intended to negate the requirement for centralized bodies.

In light of the above, one technical problem to be solved may be how to provide a solution which enables blockchain transaction mixing to be achieved in a way which is more decentralized, secure, and confidential than existing solutions and which is controlled by users of the system rather than managed by a third party transaction mixing service provider in the manner of existing systems described in the background section.

Thus, in accordance with the invention, methods and systems are provided as defined in the appended claims.

The invention may provide a computer-implemented system. It may be described as a blockchain-implemented system, a security system and/or a control system.

Additionally or alternatively, the invention may provide a system for performing transaction mixing between a plurality of users on a blockchain, configured to carry out the steps of: (i) preparing a first commitment transaction arranged to transmit control of a resource from a source address of a first user to a receiving address of a second user; (ii) preparing a second commitment transaction arranged to transmit control of a resource from a source address of the second user to a receiving address of a further user; (iii) preparing a further commitment transaction arranged to transmit control of a resource from a source address of the further user to either: (a) a receiving address of the first user; or (b) a receiving address of a yet further user and repeating step (iii) until option (a) is performed to complete a transaction chain; and executing the transaction chain, wherein at least one of the users is randomly chosen from the plurality.

The term "user" may refer to a human or a processor-based resource.

By providing such a system, a plurality of users are enabled to construct a transaction channel enabling exchange of resources with increased security and confidentiality. The transaction mixing system is distinct in forming and executing a blockchain transaction chain with at least one of the users being randomly chosen from the plurality of users in the chain. The chain is set up using commitment transactions. Such a system for exchanging digital assets between a plurality of users is more secure and does not require additional system overheads when compared to the prior art configurations described in the background section. For example, the system does not require a mixing service provider which would otherwise introduce an additional resource requirement into the system and additional management overhead for provision of this centralized transaction mixing service provider. Furthermore, the provision of a central transaction mixing service provider dilutes or compromises the decentralized, peer-to-peer architecture of a blockchain system. Such a centralized system removes control from the users. Furthermore, such a centralized system provides a focal point in the system for attack. Further still, the transaction mixing service provider may steal a user's digital assets from the pool or reveal to external parties the links between input addresses and output addresses, either intentionally or unintentionally, thus reducing security. In contrast, in the present system preparing and executing the transactions via a chain of commitment transactions is performed by the users rather than a third party. That is, the system utilizes a protocol that is not implemented/controlled by a third party.

One technical effect of the invention results in a computer system which is made to operate in a new way. Furthermore, the computer system is a better computer system in the sense of running more efficiently and effectively to the extent that the system is more robust to hacking and data manipulation.

At least one commitment transaction may be arranged to transmit control of a respective resource responsive to satisfaction of an execution condition of the at least one commitment transaction.

This provides the advantage of increasing the speed at which at least a part of the transaction chain may be executed.

The system may be configured to carry out the step of preparing at least one execution transaction arranged to satisfy a respective execution condition.

This provides the advantage of further increasing the speed at which at least a part of the transaction chain may be executed.

The execution condition of the at least one commitment transaction may comprise the supply of a respective secret value.

This enables the transaction chain to be constructed without risk to a first user, while enabling a more secure subsequent execution of the transaction chain.

At least one secret value may be chosen by the first user, and at least one execution condition may comprise the supply of the chosen secret value.

This provides the advantage of a simple way of increasing security for users.

At least one secret value may be calculable responsive to at least one of: (i) supply of the chosen secret value; and (ii) supply of at least one other secret value.

This provides the advantage of increasing the security of the system by enabling different secret values to be used without significantly increasing the time it takes to complete execution of the transaction chain.

At least one commitment transaction may be arranged to return control of a respective resource to a respective user upon satisfaction of a return condition.

This provides the advantage of increasing security against theft from a user of at least one resource.

The system may be configured to carry out the step of preparing at least one return transaction comprising a locktime, the at least one return transaction arranged to satisfy at least one respective return condition upon expiry of the locktime.

This provides the advantage of limiting the maximum amount of time allowed during use of the system, thereby reducing the amount of computer resources required.

The system may be configured to submit to a blockchain at least one prepared transaction.

This provides the advantage of preventing tampering of the at least one prepared transaction by storing it on the blockchain, thereby increasing security.

The system may be configured to execute the transaction chain in an order reverse to the order in which the transaction chain is prepared.

This enables a first user to initiate the execution of the chain of commitment transactions once complete, thereby increasing security by isolating risk to one user among a plurality. The system of any preceding claim, wherein the resources are identical to one another.

This provides the advantage of simplifying the use of the system.

Additionally or alternatively, there may be provided a computer-implemented method for participating in transaction mixing between a plurality of users on a blockchain comprising the steps of: (i) submitting to a blockchain a first commitment transaction arranged to transmit control of a first resource from a source address of a first user to a receiving address of a second user upon satisfaction of an execution condition of the first commitment transaction; and (ii) responsive to submission to the blockchain of a second commitment transaction arranged to transmit control of a third resource from a source address of a third user to a receiving address of the first user, submitting to the blockchain an execution transaction arranged to satisfy an execution condition of the third commitment transaction, wherein at least one of the users is randomly chosen from the plurality.

Additionally or alternatively, there may be provided a computer-implemented method for participating in transaction mixing between a plurality of users on a blockchain comprising the steps of: (i) submitting to a blockchain a first commitment transaction arranged to transmit control of a resource from a source address of a first user to a receiving address of a second user upon satisfaction of a condition of the first commitment transaction; and (ii) responsive to submission to the blockchain of a first execution transaction arranged to satisfy a condition of the first commitment transaction, submitting to the blockchain a second execution transaction arranged to satisfy a condition of a second commitment transaction, wherein at least one of the users is randomly chosen from the plurality.

According to certain configurations, it may be desirable to enable at least one individual to move bitcoins from one of their addresses to another address in their possession in a manner that obscures the link between both addresses and which is achieved in a secure manner without requiring a centralized coin mixing service provider. This can be achieved by providing a system in which an individual participates in a group exchange protocol where each member pays another random member of the group x, or other negotiated amount of, bitcoins and another random member pays the user x, or other negotiated amount, bitcoins. The exchange protocol is designed in such a way that the user effectively moves his/her funds to a new address, and no member of the group exchange risks losing any of their bitcoins.

BRIEF DESCRIPTION OF THE DRAWINGS

These and other aspects of the present invention will be apparent from and elucidated with reference to, the embodiments described herein. Embodiments of the present invention will now be described, by way of example only, and with reference to the accompany drawings, in which:

FIG. 2 shows an Atomic Cross-Chain Trading algorithm of the prior art;

FIG. 6 shows an example commitment transaction of the first embodiment;

FIG. 7 shows an example refund transaction of the first embodiment;

FIG. 8 shows an example payment transaction of the first embodiment;

FIG. 21 shows an example commitment transaction of the second embodiment;

FIG. 22 shows an example refund transaction of the second embodiment;

FIG. 23 shows an example payment transaction of the second embodiment; and

FIG. 24 shows example scripts for use in the second embodiment.

DETAILED DESCRIPTION

Figure 1:
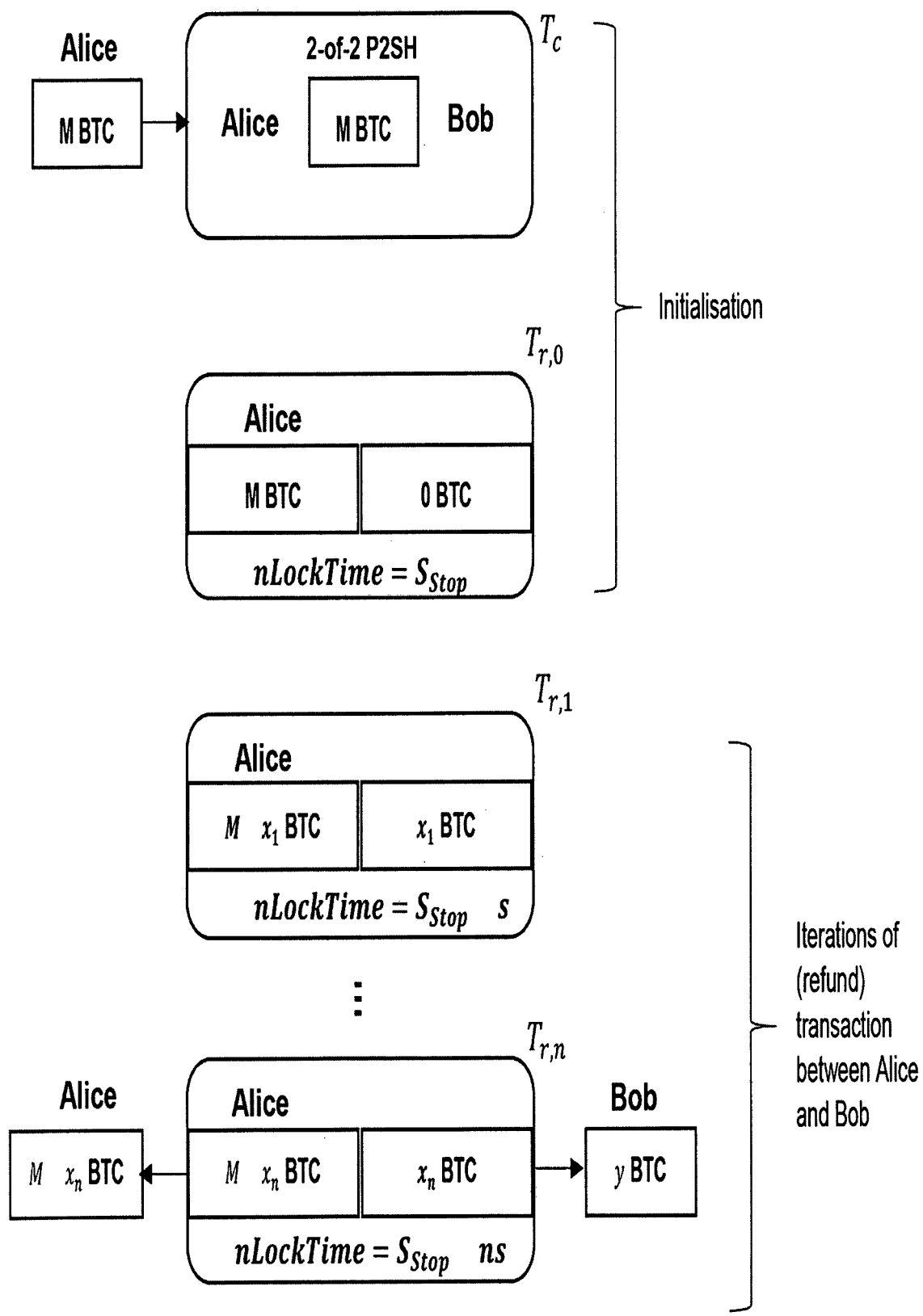
FIG. 1 shows the transactions used in a payment channel of the prior art.

A protocol, named the Group Random Exchange (GRE) protocol embodying the present invention, is described herein for a user to move funds from one address to another while obscuring the link between the user's addresses and while removing the possibility of a user having his/her funds stolen. It is built on the concept of a group agreeing for each member of the group to pay x BTC to one other member such that everyone gets paid.

Who a user pays x BTC to is random and who pays the user x BTC is also random. By doing this the user may send his x BTC to one address but accept receipt of x BTC at a different address from a different user who is randomly determined. This randomness makes it difficult for someone external to the protocol to analyse the blockchain and determine a link between the user's input and output addresses.

Moreover, the GRE protocol is able to accomplish this exchange between a group of n users where no user within the group risks losing their funds. The protocol uses refund transactions, where applicable, to allow a user to reclaim their funds if anything does not go as planned in the execution of the protocol.

The GRE Protocol builds on two existing Bitcoin-related technologies. The first of these is Payment Channels ('Introduction to Micropayment Channels' http://super3.org/introduction-to-micropayment-channels/), which is a technique designed for off-block bitcoin transactions between a pair of users and notably incorporates the usage of refund transactions. The second of these technologies is Atomic Cross-Chain Trading (ACCT) ('Atomic cross-chain trading', https://en.bitcoin.it/wiki/Atomic_cross-chain_trading), which is a protocol designed for a user with x coins in one cryptocurrency to exchange them for another user's y coins in another cryptocurrency. This is done as a "fair exchange", such that a first user cannot acquire a second user's coins without giving the second user the ability to collect the coins they are owed by the first user.

Whereas ACCT describes an exchange between two users, the present invention relates to the GRE protocol, which provides group exchange between more than two users where a second user who is paid by a first user is not the user who pays the first user.

Payment Channels

Payment channels are techniques designed for users to make multiple Bitcoin transactions without committing all of the transactions to the blockchain. In a typical payment channel implementation, a nearly unlimited amount of payments can be made but it is only ever necessary to add two transactions to the blockchain.

In addition to the reduced number of transactions being added to the blockchain and the associated reduced costs, payment channels also offer the advantage of speed and, importantly, the ability of the users to have their funds refunded if the things do not go as planned or either user decides not to proceed beyond a certain set of payments. A description of a payment channel implementation is outlined below.

Consider the scenario where Alice needs to pay Bob for a service. This may require multiple payments from Alice to Bob over a period of time as the situation demands. Alice expects to spend at most 15 BTC (in total) to Bob in the possible set of exchanges. To facilitate this, a payment channel is established between Alice and Bob and operates as follows:

Alice creates a 2-of-2 multisignature pay to script hash (P2SH) transaction, $T_c$, governed by both Alice and Bob that commits 15BTC originating from Alice. At this point the transaction is not submitted to the bitcoin network (such a multisignature address requires that 2 individuals (Alice and Bob) sign any transaction that spends money from this address);

Alice creates a separate refund transaction, $T_{r,0}$, returning all the funds from the 'multisignature controlled funds' to Alice. This transaction includes an nLockTime value of 100 blocks (nLockTime is a Bitcoin transaction parameter that allows a Bitcoin transaction to only be executable after a specified time has passed). Bob signs the transaction. This refund transaction allows Alice to be refunded, after nLockTime has transpired, if the exchange between Alice and Bob goes awry;

Alice signs the original transaction $T_c$;

At this point Alice and Bob may proceed to create new refund transactions to reflect the (off the blockchain) payments being made from Alice to Bob. These refund transactions would reflect the net sum of money that Alice is required to pay Bob at that point in time. As an example, if Alice is to pay Bob 5BTC, a new refund transaction, $T_{r,i}$, is created that has an outputs sending 5BTC to Bob and 10BTC back to Alice. If Alice needs to pay another 5BTC to Bob then the new refund transaction, $T_{r,i+1}$, is created with outputs sending 10BTC to Bob and 5BTC to Alice. For each new refund transaction, assuming they are in agreement with the details, both parties sign the transaction but do not necessarily submit the transaction to the network;

Note that each successive refund transaction created has a lower nLockTime than that of the previous refund transaction;

$nLockTime(T_{r,i+1}) < nLockTime(T_{r,i});$

If a user refuses to sign any $T_{r,i}$ then an aggrieved user may simply submit the $T_{r,i-1}$. In the worst case scenario Alice signs $T_{r,0}$ and submits it to the network reclaiming all her funds (after nLockTime has expired); and The final refund transaction constructed represents the net sum of funds being transferred from Alice to Bob. This transaction is submitted to the network.

FIG. 1 shows the transactions used in a payment channel. M represents the maximum amount of money that may be sent from Alice to Bob. $x_i$ is the current net sum of funds Alice needs to pay to Bob. $S_{stop}$ is the nLockTime on the initial refund transaction. n is the number of refund transactions created in the ongoing (off-block) payments made between Alice and Bob (this excludes the initial refund transaction). s is the time allotted for both users to agree to a refund transaction before a party risks the other party submitting the previous refund transaction, effectively ending the exchanges between Alice and Bob.

Note that:

$t+n*s < S_{stop}$, where $t$ is the current time, and $(S_{stop}-n*s) \geq s.$

Figure 9:
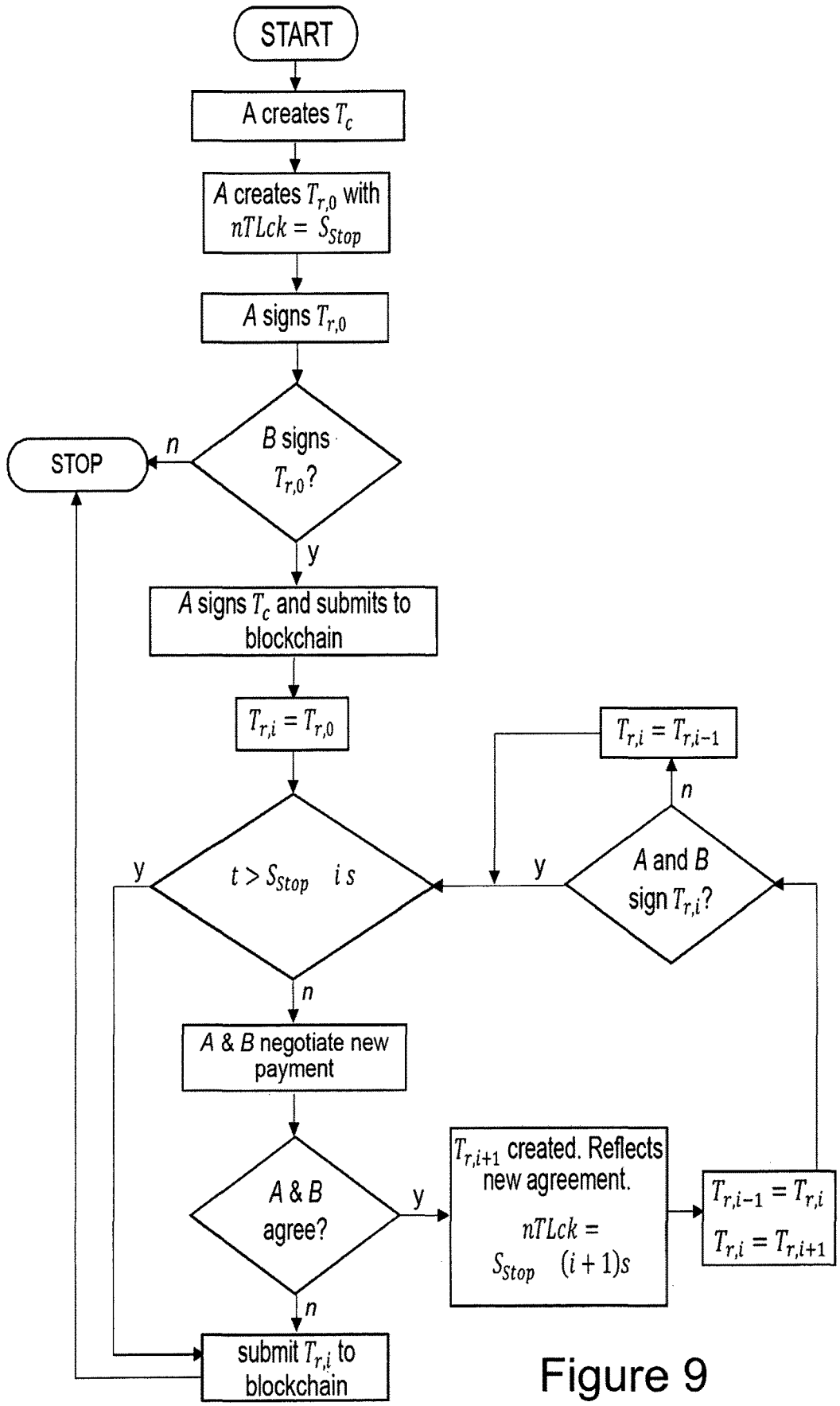
FIG. 9 shows an algorithm for constructing the payment channel of FIG. 1.

Transactions $T_c$ and $T_{r,n}$, of FIG. 1 are the transactions that appear on the blockchain. FIG. 9 shows a flow chart comprising steps involved in constructing the payment channel between Alice and Bob.

Atomic Cross-Chain Trading

For digital exchanges a "fair exchange" protocol is often necessary. The exchange represents a scenario where one user, UserA, is in possession of a value x and wants to exchange it for a value y owned by UserB. A fair exchange protocol allows the two users to either: (i) both honour and exchange; or (ii) neither honour and exchange. In Even, S. and Yacobi, Y., 1980. Relations among public key signature systems (Vol. 268). Technical Report 175, Technion, Haifa, Israel, (http://ftp.cs.technion.ac.il/users/wwwb/cgi-bin/tr-get.cgi/1980/CS/CS0175.pdf), it is shown that deterministic fair exchange is impossible without a trusted third party.

In the case of ACCT its authors devised a fair exchange protocol for two users to exchange coins across separate cryptocurrencies. For their solution the blockchains of the cryptocurrencies act as the trusted third party. An algorithm for ACCT is shown in FIG. 2, where Alice, A, pays w BTC to Bob, B, in exchange for v alt-coins.

This is ACCT (with timeout). If the process is halted, it can be reversed no matter when it is stopped.

With reference to FIG. 2, below is an example timeline of events during use of ACCT by users A and B:

Before 1): Nothing public has been broadcast, so nothing happens;

Between 1) and 2): A can use a refund transaction after 72 hours to get his money back;

Between 2) and 3): B can get a refund after 24 hours. A has 24 more hours to get his refund;

After 3): Transaction is completed by 2),

A must spend his new coin within 24 hours or B can claim the refund and keep his coins;

B must spend his new coin within 72 hours or A can claim the refund and keep his coins.

For safety, both A and B should complete the process with lots of time until the deadlines.

Group Random Exchange

The present invention relates to a Group Random Exchange (GRE) protocol. It provides a solution for the swapping of bitcoins within a group of n users where n>2. Each user in the group is able to swap an amount of bitcoins in their possession for the same amount of bitcoins.

However, without any change to the protocol, it is possible for the amount of bitcoins being exchanged between two users to not be equal. The value being exchanged between $U_i$ and $U_{(i+1) mod\, n}$ may be any value the pair of users is able to negotiate between themselves.

Assuming x BTC is the agreed amount being exchanged, if desirable to all of the users affected, a user may pay (x+a) BTC whereas a user may withdraw (x−b) BTC. For example, a user $U_1$ has 10BTC for exchange. $U_1$ is willing to accept 8BTC from user $U_0$ if that is the best offer available to $U_1$. $U_1$ does this while understanding that it remains possible that further user $U_2$ will insist on receiving 10BTC. In other words, the value $U_1$ pays does not necessarily have to be the value $U_1$ is paid, if and only if $U_1$ accepts these terms, and the value $U_1$ pays may be the value $U_1$ is paid if $U_1$ insists.

From hereon, the description is limited for explanatory purposes only to the scenario where each user pays and is paid x BTC.

Furthermore, users may exchange tokens within the protocol. A token represents an asset or resource according to a smart contract associated with the token such that control of the token affords control of the asset or resource.

The net change in the bitcoins owned by a user does not change after participating in the exchange protocol, assuming transaction fees are ignored (transaction fees are costs associated with every Bitcoin transaction). Given a first user being UserA, UserA pays UserB the amount x BTC, UserC pays UserA x BTC, where UserB is not the same user as UserC. Additionally, each user has a source address associated with sending payments, and a receiving address associated with receiving payments, where the source address and receiving address are different. However, by participating in the protocol the user's bitcoins which were stored at a Bitcoin address are now in effect transferred to another address owned or controlled by the same user. Due to the exchange protocol processes, the transfer of bitcoins across addresses is accomplished in a way that obscures, in analysis of the blockchain, the transfer of funds.

The GRE protocol differs from ACCT in that ACCT only outlines a mutual exchange between a pair of users, whereas the GRE protocol describes an exchange where:

there are more than 2 users; and in the process of being paid and paying, the second user a first user pays is not the user from whom the first user receives payment.

The GRE protocol achieves this in a way that:

users of the protocol are at no risk of losing their bitcoins; and the second user who a first user pays is random, as is the user who pays the first user.

Group Random Exchange of the First Type—Secret Value

The group random exchange protocol operates in one of two ways, each embodying the present invention. A configuration of the present invention will now be described.

Given the interest of the set of n users $U_i|i\in[0, n-1]$ participating in the GRE protocol of a configuration of the present invention to swap x BTC, the protocol operates in the following way:

The users are randomized to realise an ordered set $\{U_0, U_1, \ldots, U_{n-2}, U_{n-1}\}$;

One of these users is deemed the 'initiator' or 'initiating user'. For our purposes $U_0$ is considered the initiator;

The initiator $U_0$ chooses a random number k and calculates H(k) where H(•) represents a deterministic hash function;

The value of k is kept private by $U_0$ but the value H(k) is distributed to all users of the GRE;

A time value s is chosen that represents the amount of time each user $U_i$ is given to construct the payment channel $U_i \rightarrow U_{(i+1) mod\, n}$, retrieve the value of k, and submit execution transaction $T_{pay}$ that pays $U_{(i+1) mod\, n}$ to the Bitcoin network. Any user in the group may choose time s, given the consensus of the other users. In a preferred embodiment, the initiator chooses s to simply the protocol. Time s is expressed in either seconds or number of blocks;

Another value, S, is chosen as the starting time of the first payment to a user being submitted to the Bitcoin network. Any user in the group may choose S, given the consensus of the other users. In a preferred embodiment, the initiator chooses s to simply the protocol. Note that S represents a point in time specified in either Unix time or block height, whereas s represents a time span;

A one-way payment channel is established between every pair of users where the direction of the payment is such that $U_i$ pays $U_{(i+1) mod\, n}$ (represented herein by $U_i \rightarrow U_{(i+1) mod\, n}$). As an example, assuming n=7, the payment channels of the GRE would consist of $U0 \rightarrow U1, U1 \rightarrow U2, \ldots, U6 \rightarrow U0$.

Figure 3:
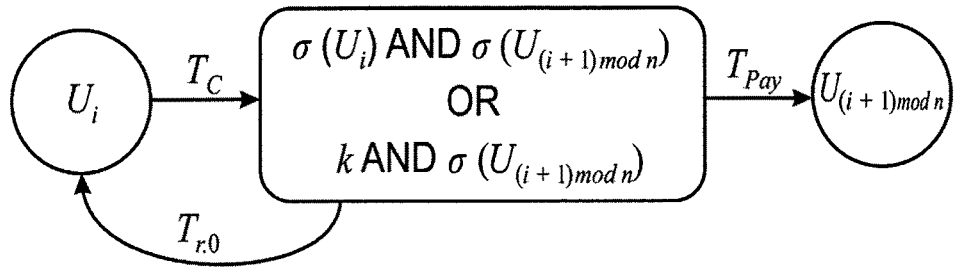
FIG. 3 shows a payment channel of a first embodiment of the present invention.
Figure 4:
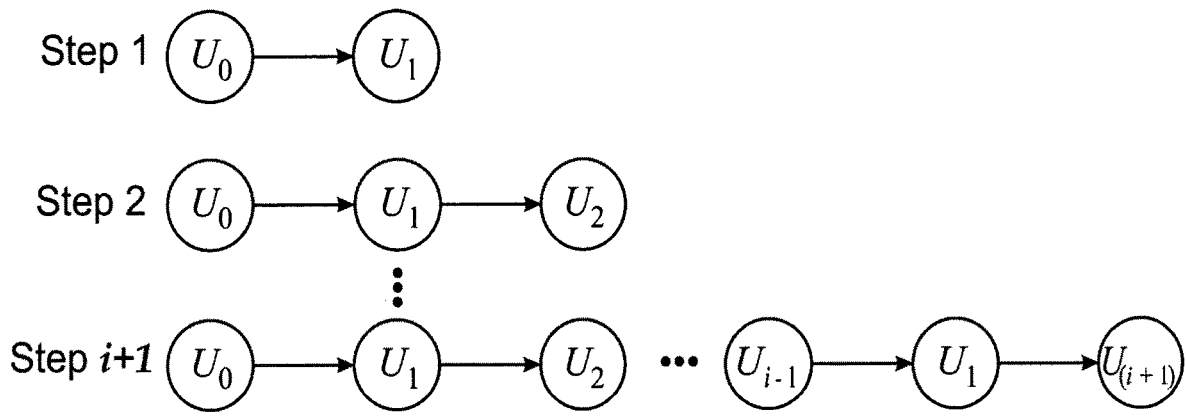
FIG. 4 illustrates an order in which payment channels of the present invention may be created.
Figure 10:
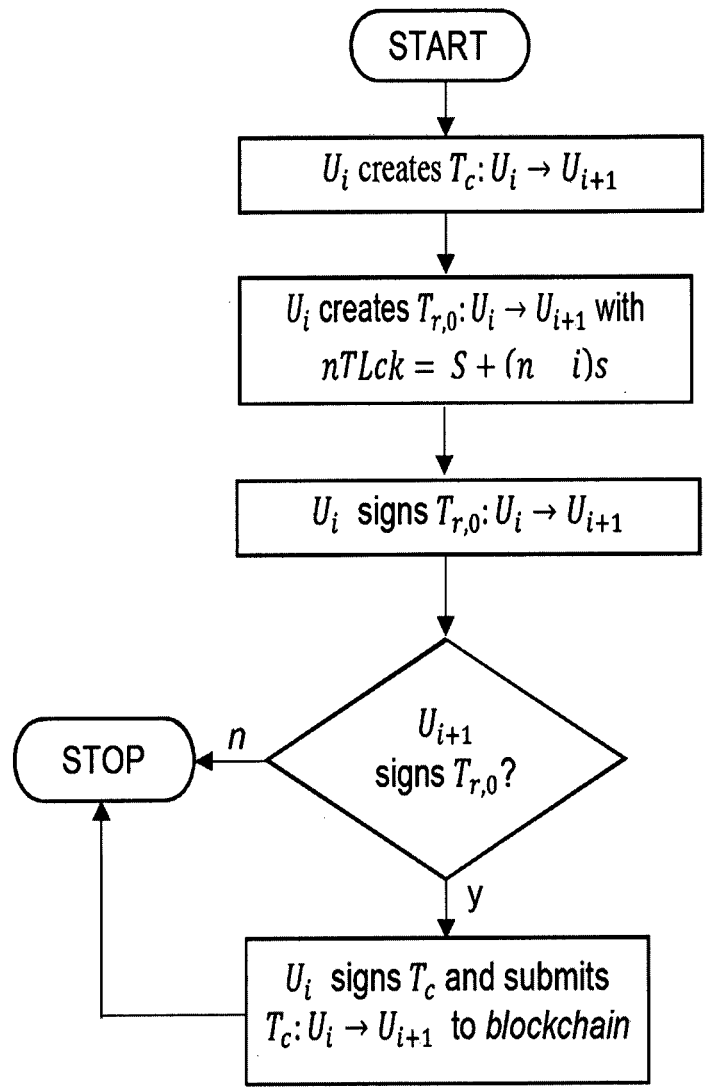
FIG. 10 shows an algorithm for constructing a payment channel of the first embodiment.

The processes of the creation of a payment channel $U_i \rightarrow U_{(i+1) mod\, n}$ are shown in FIGS. 3 and 10, wherein $\sigma(U_i)$ represents the signature of $U_i$:

the initial commitment transaction $T_c$ makes available x BTC that can only be spent by providing either: (i) the signatures of both $U_i$ and $U_{(i+1) mod\, n}$; or (ii) k and the signature of $U_{(i+1) mod\, n}$ (see FIG. 6 for reference);

only one refund transaction is required here: refund function $T_{r,0}$, which returns all x BTC to $U_1$ (see FIG. 7 for reference);

the refund transaction $T_{r,0}$ contains an nLockTime value S+(n−i)s;

The refund transaction $T_{r,0}$ must be signed by $U_{(i+1) mod\, n}$ before the initial commitment transaction $T_c$ is submitted to the Bitcoin network;

The payment channel contains a payment transaction $T_{pay}$ which pays x BTC, from the committed x BTC of $T_c$, to $U_{(i+1) mod\, n}$; and the <scriptSig> for the payment transaction $T_{pay}$ to $U_{(i+1) mod\, n}$ contains within it value k (see FIG. 8 for reference);

It is important that the payment channels between pairs of users be created in an ordered sequence, in that the payment channel $U_{i-1} \rightarrow U_i$ is set up before the payment channel $U_i \rightarrow U_{(i+1) \bmod n}$. This begins with the creation of the first payment channel $U_0 \rightarrow U_1$ where $U_0$ is the initiator and ends with the last payment channel $U_{n-1} \rightarrow U_0$. FIG. 4 illustrates the order of construction of the payment channels.

In some configurations, the order of the sequence is important as this allows user $U_i$, before risking making their payment, to ensure that:

there exists a $T_{pay}$ transaction to $U_i$ that requires only that $U_i$ has knowledge of k for transaction $T_{pay}$ to be accepted by the Bitcoin network; and the criteria found in the $T_{pay}$ of the payment channel $U_i \rightarrow U_{(i+1) \bmod n}$ ($U_i$ spends) are the same as that of $T_{pay}$ of the payment channel $U_{i-1} \rightarrow U_i$ ($U_i$ receives).

Only the initiator $U_0$ does not have to prioritise receiving ahead of payment. However $U_0$ cannot be cheated as $U_0$ is the only user with knowledge of the value of k. Therefore no withdrawal can be performed by anyone in the GRE protocol until $U_0$ is comfortable starting the process (coinciding with its release of k).

Figure 11:
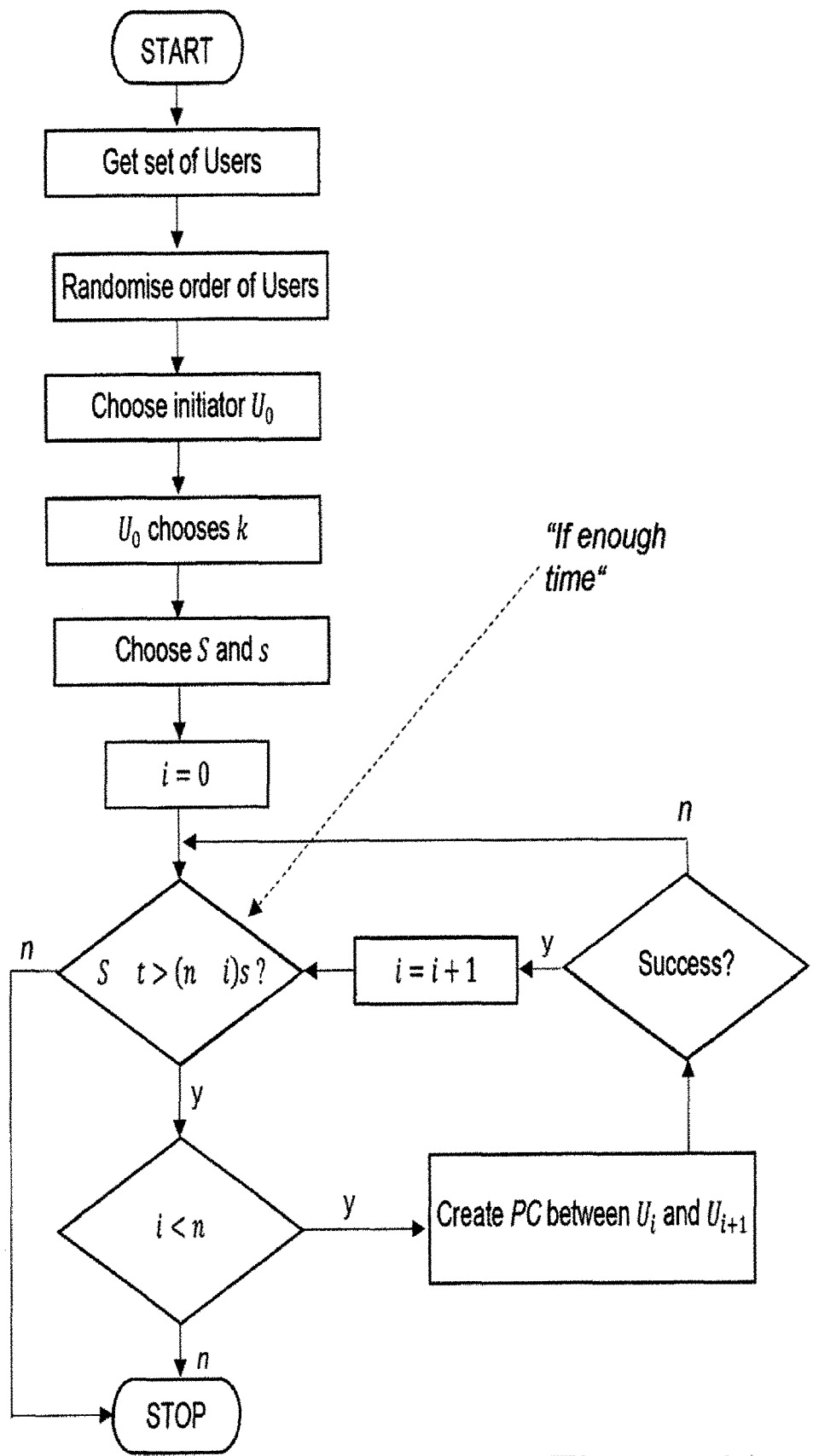
FIG. 11 shows an algorithm for constructing a chain of payment channels of the first embodiment.

The processes of the creation of the set of $U_i \rightarrow U_{(i+1) \bmod n}$ payment channels for a GRE instance are illustrated in FIG. 11.

It is assumed that the final payment channel $U_{n-1} \rightarrow U_0$ is finalised at or before time S. Once this final payment channel is constructed, a chain of transactions, or a transaction chain, can be said to have been completed linking all of the users of the protocol.

Figure 5:
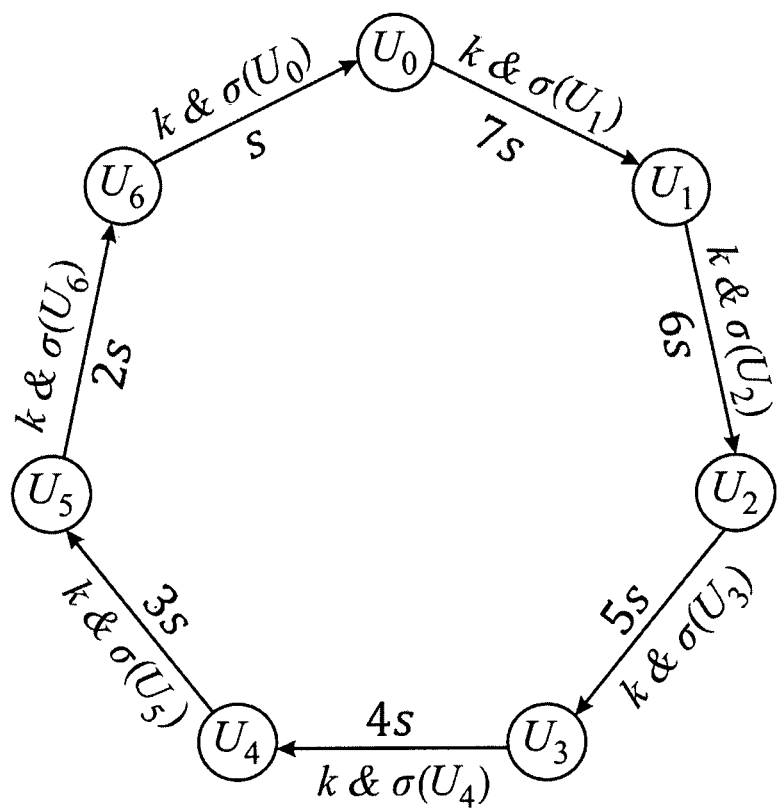
FIG. 5 illustrates a chain of payment channels of the first embodiment.

FIG. 5 illustrates a representation of the $U_i \rightarrow U_{(i+1) \bmod n}$ payment channels existing between all users of the GRE protocol. Arrows signify the payment channels and direction of $T_{pay}$ payment. Expressions externally adjacent the arrows represent the criteria for transaction $T_{pay}$ to be accepted by the blockchain. Note that $\sigma(U_i)$ represents the signature of $U_i$. Expressions internally adjacent the arrows represent the s time span values.

In light of the circular arrangement, the fact that the order of $U_i | i \in [0, n-1]$ was random means that the persons paying and paid by user $U_i$ are both random. Furthermore, the persons paying and paid by user $U_i$ are different.

The initiator $U_0$ spends the transaction $T_{pay}$ of the existing payment channel $U_{n-1} \rightarrow U_0$, revealing the value of k. $U_0$ can communicate this value of k directly to $U_{n-1}$ or this value may be retrieved from the blockchain.

Similarly each user $U_i$ may directly communicate the value k to its payer $U_{i-1}$. If $U_i$ does not, user $U_{i-1}$ may find the value in the blockchain ledger (within at least time s).

As the blockchain takes, at the time of filing this application, on average 10 minutes to confirm a transaction, the value of s should be chosen such that the time period it represents is sufficient for any user $U_i$ to find if necessary, within that time period, the value of k in a transaction $T_{pay}$ (of the payment channel $U_i \rightarrow U_{(i+1) \bmod n}$) after the transaction is submitted to the Bitcoin network. The value of s should also include an estimated time for the construction of the payment channel between a pair of users. Therefore s may be chosen to be $s = s_k + \varepsilon$ where $s_k$ is the estimated time to find k and submit $T_{pay}$ and $\varepsilon$ is the estimated time to construct the payment channel.

As the initiating user $U_0$ has now submitted to the network the $T_{pay}$ transaction of the existing payment channel between $U_{n-1}$ and $U_0$, revealing the value of k to $U_{n-1}$, the value of k can then be revealed to every other user $U_i$ in a reverse sequential way (from $U_{n-1}$ to $U_2$). This is based on the premise that each user, $U_i$, will be invested in submitting the transaction ($T_{pay}$ of the payment channel $U_{i-1}$ to $U_i$) that allows themselves to get paid. User $U_i$ submitting said transaction will require obtaining the value of k from $T_{pay}$ of the payment channel $U_i$ to $U_{i+1}$ (which would have been made available previously). Through $U_i$ submitting that transaction $T_{pay}$ of the payment channel $U_{i-1}$ to $U_i$, the value of k is then made available to user $U_{i-1}$. This process cascades all the way from $U_{n-1}$ to $U_1$ in such a way that each user $U_i$ cashing in reveals k to user $U_{i-1}$, allowing the user $U_{i-1}$ to also cash in.

More formally, the sequence of submission of $T_{pay}$ transactions executing the payment channels occurs as follows:

$$[T_{pay}: U_{n-1} \rightarrow U_0], [T_{pay}: U_{n-2} \rightarrow U_{n-1}], \ldots, [T_{pay}: U_1 \rightarrow U_2], [T_{pay}: U_0 \rightarrow U_1]$$

Completion of the set of $T_{pay}$ transactions successfully concludes the GRE. Each user paid x BTC and each user received x BTC.

Figure 12:
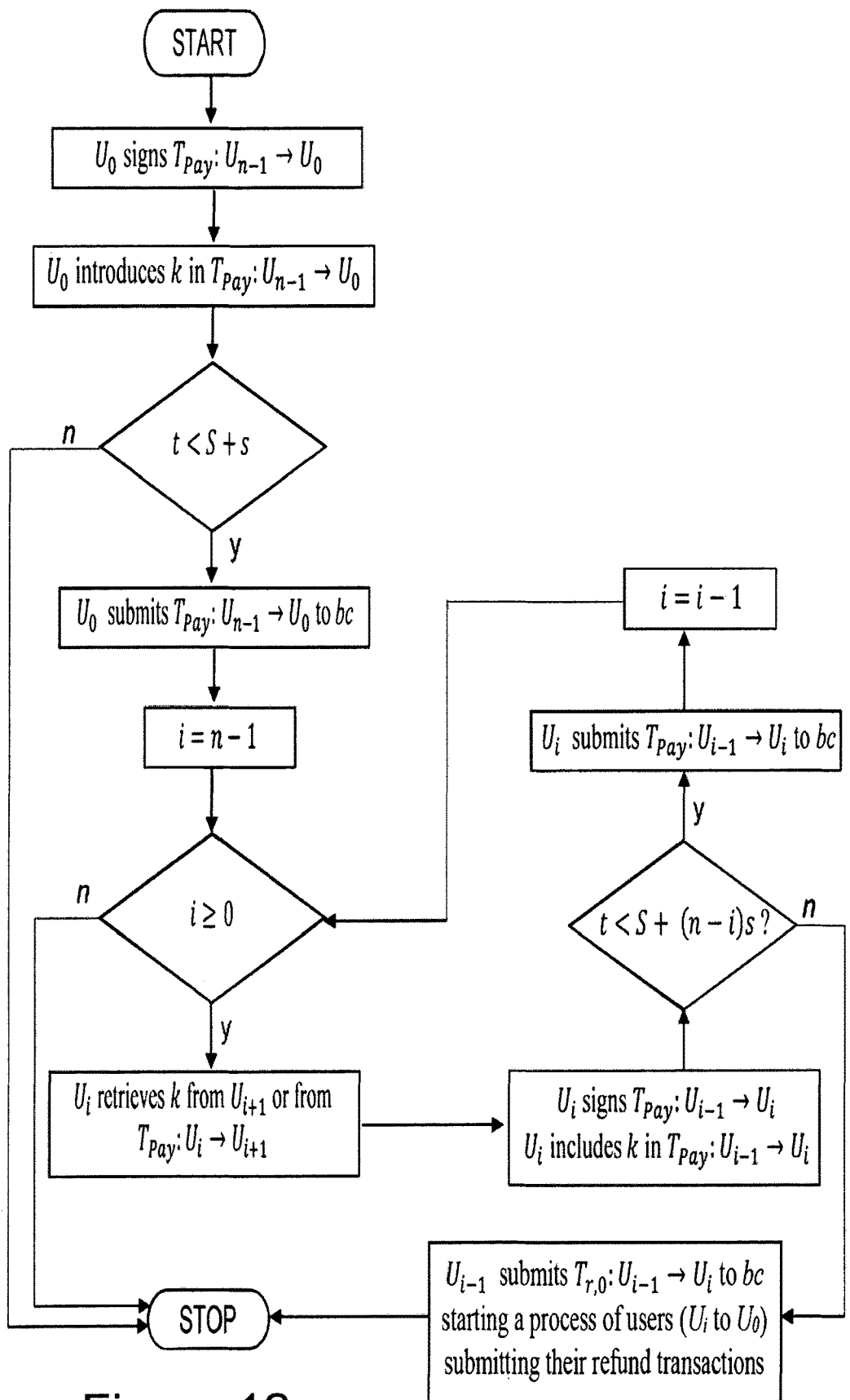
FIG. 12 shows an algorithm for the process of submitting payment transactions of the first embodiment.

The processes of submitting the $T_{pay}: U_{n-1} \rightarrow U_{(i+1) \bmod n}$ transactions for a GRE instance are illustrated in FIG. 12.

Below, a description is given of the construction of the Bitcoin transactions utilised in the payment channel $U_i \rightarrow U_{(i+1) \bmod n}$ between a pair of users. These payment channels comprise three main transactions:

Deposit into 2-of-2 multisignature Transaction $T_c$: This transaction represents the commitment component of the payment channel, and may be referred to as a commitment transaction. Here, through the transaction, user $U_i$ sends/commits a specified number of bitcoins, x BTC, to be governed by either:

a 2-of-2 multisignature $U_{(i+1) \bmod n}$)

OR knowledge of a value k AND the signature of $U_{(i+1) \bmod n}$;

Refund Transaction $T_{r,0}$: This transaction represents the refund of x BTC (from the commitment transaction) back to user $U_i$ after a specified time has expired. For this transaction to be executed successfully it requires the signatures of users $U_i$ and $U_{(i+1) \bmod n}$; and Payment Transaction $T_{pay}$: This transaction is the payment of x BTC from $U_i$ to $U_{(i+1) \bmod n}$. For this transaction to be executed successfully it requires the knowledge of value k and the signature of $U_{(i+1) \bmod n}$. Payment transactions may also be referred to as execution transactions.

Note that while the details of the transaction are limited to the <scriptSig>, <scriptPubkey>, nLockTime, and output values of the various transactions, as these are most relevant to the GRE protocol described, other functions and values may be used.

Group Random Exchange of the Second Type—Changing Secret

A further configuration of the present invention will now be described.

In the case of the GRE protocol of the configuration described above, the value k being common for each of the payment channels may act as a limitation on the level of anonymity the GRE may provide to a user thereof. This is due to the fact that the shared use of k and/or its hash, H(k), makes it easier for an external observer to associate the set of transactions involved in that specific instance of a GRE. This reduces the observer's effort required to trace a user's movement of funds from one address to another.

In contrast to the configuration described above which uses the same secret value in all payment channels, the configuration described below uses a different secret value for each of the payment channels in the GRE exchange. Moreover, although the secret value is different for each channel, the revelation of the secret value when a transaction is submitted to the blockchain provides sufficient information for the subsequent revelation of the secret value in the next payment channel of the sequence.

To achieve this functionality, this configuration utilises the property of Elliptical Curve (EC) cryptography such that $E(m)+E(n)=E(m+n)$; where $E(x)=xG$ and $G$ is a base point on the Elliptic Curve. However, other types of encryption having substantially similar homomorphic-like properties may be used in place of EC encryption.

An Elliptic Curve is the set of points described by the equation:

$$y^2 \equiv x^3 + ax + b \pmod{p};$$

where $4a^3 + 27b^2 \not\equiv 0 \pmod{p}$ and p is prime.

The EC Arithmetic functionality required inside Bitcoin script is that of point multiplication by scalar. This is the operation such that:

$$nP = \underbrace{P + P + \ldots + P}_{n};$$

where n is a natural number, P is a point on the Elliptic Curve, and + is the operator for addition of points on the EC.

Scalar multiplication in turn requires the specific EC group operations Point Addition and Point Doubling:

Point Addition P+Q: With this operation, we compute a new point on the EC as a negation of the intersection of the curve. This can be described as R=P+Q.

Point Doubling P+P: Using point addition, we can compute a point double of P. This can be described as R=P+P=2P.

More specifically, given two points, $P(x_1, y_1)$ and $Q(x_2, y_2)$, on the EC:

$$P + Q = (x_3, y_3);$$

where:

$$x_3 = m^2 - x_1 - x_2 \bmod p;$$

$$y_3 = m(x_1 - x_3) - y_1 \bmod p; \text{ and}$$

$$m = \begin{cases} \dfrac{y_2 - y_1}{x_2 - x_1} \bmod p = \text{if } P \neq Q & \text{(Point Addition)} \\ \dfrac{3x_1^2 + a}{2y_1} \bmod p : \text{if } P = Q & \text{(Point Doubling)} \end{cases}.$$

As described above, the use of the value k (and in tandem H(k)), as criterion in each of the payment channels in the GRE circuit of the configuration using the same secret value in all payment channels, may prove to be a limitation as it relates to desire for anonymity.

If a user desires anonymity in the GRE exchange as it relates to the user's movement of bitcoins, it is expected that the address that $U_1$ pays x BTC from is different from the address that user receives x BTC into. This disconnect between addresses is meant to disassociate the payment and receipt transactions from each other in the Bitcoin blockchain.

However, an external observer with knowledge of the GRE protocol would know that Bitcoin transactions with scripts that contain a type of criteria are artefacts of an instance of a GRE. Moreover, since k and its hash are found within a subset of these GRE instances, the external observer would then be able to identify all transactions related to a specific instance of GRE, or at least drastically reduce the size of the set of possible transactions.

While not guaranteeing success, this puts the external observer in a better position to track the movement of bitcoins in the GRE instance.

This configuration uses a GRE protocol wherein each payment channel uses a different unique secret value (sv) and a corresponding encrypted version of the secret value. It is to be noted that, in this configuration, hash functions themselves are not used but are replaced by EC encryption. This serves to reduce the ability for external observers to identify the set of transactions belonging to a specific GRE instance.

The different secret values of this configuration are expected to satisfy the following conditions:

a. The secret values should be difficult to guess;
b. The revelation of an $sv_{(i+1) \bmod n}$ in executing $T_{Pay}$ for the payment channel $U_i \rightarrow U_{(i+1) \bmod n}$ should allow $sv_1$ of the next payment channel in GRE sequence $U_{i-1} \rightarrow U_i$ (anticlockwise) to be revealed or at least be easily calculable;
c. It should be difficult for external observers to identify a relationship between secret keys (or secret key encryptions (ciphertexts)); and
d. Users in the exchange should be at no risk of losing their funds.

It is possible to satisfy the previous criteria using EC encryption as a replacement of hash functions. For EC encryption a scalar value is multiplied by a base point G on the EC. The scalar value k is a secret key and Q=kG is the encrypted output. Determining k from Q is a 'hard' discrete logarithm problem.

Furthermore, for the addition operator of Elliptic Curve arithmetic, $mG+nG=(m+n)G$ for a base point G.

This characteristic of EC cryptography allows for the revelation of another secret value, in sequence, for condition b.

Given a group of n users $\{U_1 | i \in [0, n-1]\}$ participating in the GRE protocol to swap x BTC, the protocol of this configuration of the present invention operates in the following way.

Users agree upon parameters (p,a,b,G,n,h) of Elliptic Curve Digital Signature Algorithm (ECDSA) curve. e.g. secp256k1;

The users are randomized to realise an ordered set $\{U_0, U_1, \ldots, U_{n-2}, U_{n-2}\}$;

One of these users is deemed the 'initiator'. For our purposes $U_0$ is considered the initiator;

The initiator $U_0$ chooses a random number $k_s$ and calculates $k_s G$ where G represents the base point on the Elliptic Curve;

The value of $k_s$ is kept private by $U_0$;

Each of the other users $U_1$ to $U_{n-1}$ chooses a random number. $U_1$ selects $k_1$, $U_2$ selects $k_2$, . . . , and $U_{n-1}$ selects $k_{n-1}$. Each of these other users securely send their chosen value to $U_0$. $U_0$ also chooses a second random number, $k_0$.

A time value s is chosen that represents the amount of time each $U_i$ is given to construct the payment channel $U_i \rightarrow U_{(i+1) \bmod n}$, retrieve the necessary secret value, and submit the execution transaction $T_{Pay}$ that pays $U_{(i+1) \bmod n}$ to the Bitcoin network. Time s is expressed as either seconds or number of blocks.

Another value S is chosen as the starting time of the first payment to a user being submitted to the Bitcoin network. Note that S represents a point in time specified in either Unix time or block height, whereas s represents a time span.

A one-way payment channel is established between every pair of users where the direction of the payment is such that $U_i$ pays $U_{(i+1) mod\ n}$. As an example, assuming n=7, the payment channels of the GRE would comprise $U_0 \rightarrow U_1$, $U_1 \rightarrow U_2, \ldots$, and $U_6 \rightarrow U_0$.

Figure 13:
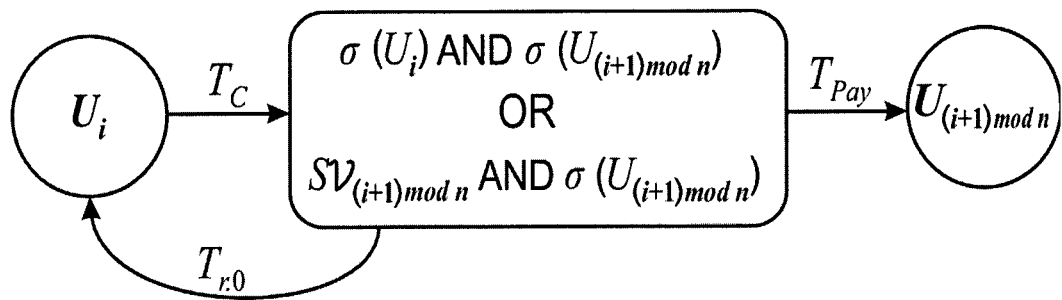
FIG. 13 shows a payment channel of a second embodiment of the present invention.
Figure 14:
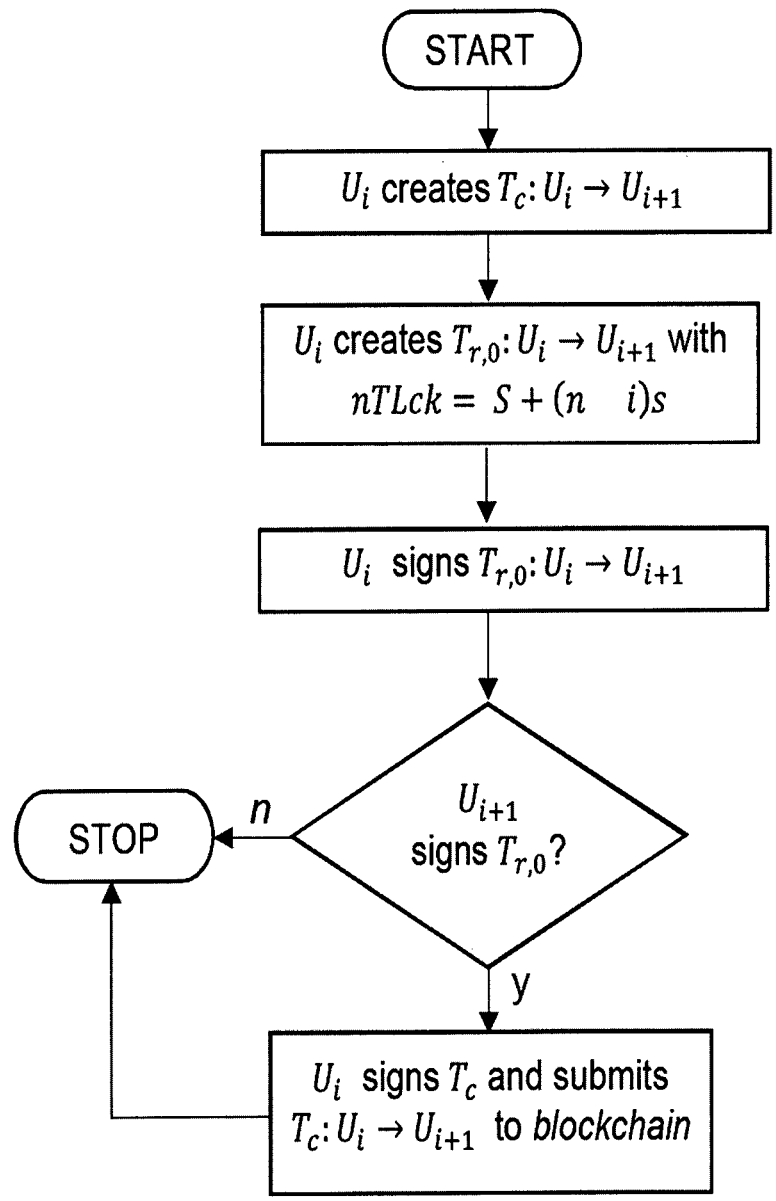
FIG. 14 shows an algorithm for constructing a payment channel of the second embodiment.

The processes of the creation of a payment channel $U_i \rightarrow U_{(i+1) mod\ n}$ are described below and illustrated in FIGS. 13 and 14:

The initial commitment transaction $T_c$ makes available x BTC that can only be spent, as per its <scriptPubkey>, by either 'the signatures of both $U_i$ and $U_{(i+1) mod\ n}$' OR '$sv_{(i+1) mod\ n}$ AND signature of $U_{(i+1) mod\ n}$';

There is only need for one refund transaction for our purposes; this refund transaction, $T_{r,0}$ returns all x BTC to $U_1$;

The refund transaction, $T_{r,0}$, of the payment channel contains an nLockTime value S+(n−i)s;

The refund transaction $T_{r,0}$ must be signed by $U_{(i+1) mod\ n}$ before the initial commitment transaction $T_c$ is submitted to the Bitcoin network;

The payment channel contains a payment transaction $T_{Pay}$ which pays x BTC, from the committed x BTC of $T_c$, to $U_{(i+1) mod\ n}$; and The <scriptSig> for the payment transaction $T_{Pay}$ to $U_{(i+1) mod\ n}$, is expected to contain within it a value $sv_{(i+1) mod\ n}$.

It is important that the payment channels between pairs of users be created in an ordered sequence, in that the payment channel $U_{i-1} \rightarrow U_i$ is set up before the payment channel $U_i \rightarrow U_{(i+1) mod\ n}$. This begins with the creation of the first payment channel $U_0 \rightarrow U_1$ where $U_0$ is the initiator and ends with the last payment channel $U_{n-1} \rightarrow U_0$.

In some configurations, the order of the sequence is important as this allows user $U_1$ to, before making their payment and undertaking the risk associated with making the payment, ensure that there exists a $T_{Pay}$ transaction to $U_i$ that $U_i$ is able to successfully execute if $U_i$ makes his/her $T_{Pay}$ payment to $U_{(i+1) mod\ n}$.

Figure 15:
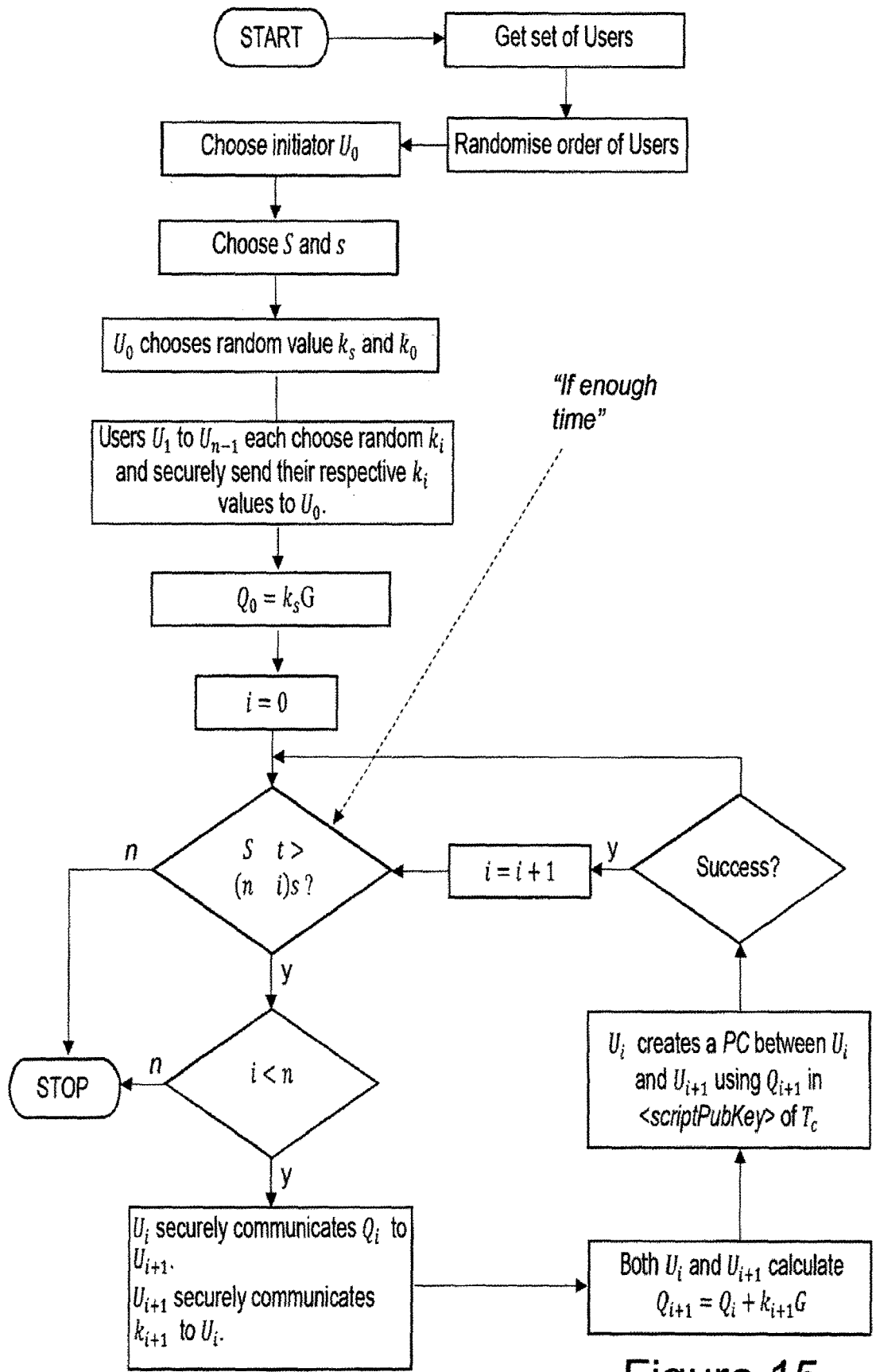
FIG. 15 shows an algorithm for constructing a chain of payment channels of the second embodiment.
Figure 16:
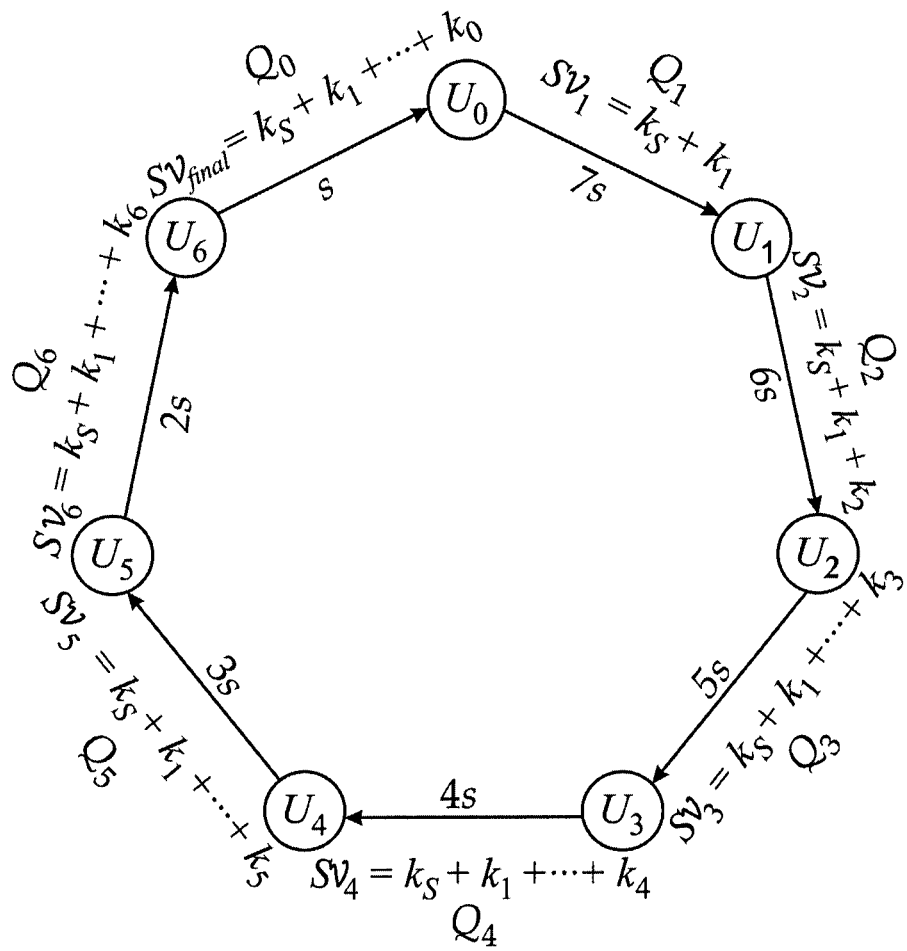
FIG. 16 illustrates a chain of payment channels of the second embodiment.

With reference to FIGS. 15 and 16, the preparation of the secret values used in this configuration will now be described.

1. The default value of the $sv_0$ is set as $sv_0 = k_s$. Recall that $k_s$ is a random value chosen by the initiator, $U_0$, in the GRE protocol list of users. This $k_s$ value is central to the security of the protocol, is known only to $U_0$, and kept secret until all payment channels are created and completed to the satisfaction of $U_0$;

2. $U_0$ encrypts the default sv value $k_s$ by multiplying it by the base point G of the Elliptic Curve. Where $Q_i$ is the encrypted version of the $sv_i$ value, the encrypted version of the default sv is $Q_0 = sv_0 G = k_s G$;

3. For the first payment channel created, $U_0 \rightarrow U_1$, $U_1$ communicates its random number $k_1$ to $U_0$ and $U_0$ communicates the 'encrypted version of the secret key', $Q_0$, to $U_1$;

4. The sv value for payment channel created, $U_0 \rightarrow U_1$, is to be $sv_1 = sv_0 + k_1$, for which its ciphertext is:

$$Q_1 = Q_0 + k_1 G;$$

Noting that:

The new secret value ($k_s + k_1$) is present in the calculation of $Q_1$, given that:

$$Q_1 = k_s G + k_1 G = (k_s + k_1) G;$$

user $U_1$ has no knowledge of $k_s$ and in tandem the secret value for the transaction; and both $U_1$ and $U_0$ can calculate and verify the other's calculation of $Q_1$;

5. Steps 3 and 4 may be generalised for all other payment channels in the GRECS circuit. This generalisation is described below:

$U_{(i+1) mod\ n}$ communicates their random number $k_{(i+1) mod\ n}$ to Ui. $U_i$ communicates the encrypted version of the secret key, $Q_i$, to $U_{(i+1) mod\ n}$;

The sv value for payment channel created is to be $sv_{(i+1) mod\ n} = sv_i k_{(i+1) mod\ n}$, for which its encrypted value is:

$$Q_{(i+1) mod\ n} = Q_i + k_{(i+1) mod\ n} G;$$

Noting that, for the payment channel:

the new secret value $sv_{(i+1) mod\ n} = k_s + k_1 + k_2 + \ldots + k_i + k_{(i+1) mod\ n}$ can be seen in the calculation of $Q_{(i+1) mod\ n}$, given that:

$$Q_{(i+1) mod\ n} = \frac{k_s G + k_1 G + k_2 G + \ldots + k_i G + k_{(i+1) mod\ n} G}{Qi}$$

$$(k_s + k_1 + k_2 + \ldots + k_i + k_{(i+1) mod\ n}) G;$$

user $U_{(i+1) mod\ n}$ has no knowledge of the secret value for the transaction as $k_s$ and all other previous iterations of sv have been encrypted; and both $U_{(i+1) mod\ n}$ and $U_i$ can calculate and verify the other's calculation of $Q_{(i+1) mod\ n}$.

Note that the previous processes apply also to the final payment channel $U_{n-1} \rightarrow U_0$. As such, in addition to the secret random number $k_s$, $U_0$ must also create a second random value $k_0$. $k_0$ is the final value added to the secret value. Note that the final secret value is labelled $sv_{final}$ rather than $sv_0$; and 6. Only the initiator $U_0$ does not have to prioritise having the payment channel that pays him/her be established before the payment channel where he/she pays. This is because $U_0$ cannot be cheated as $U_0$ is the only person with knowledge of the value of $k_s$ which is required by all $T_{Pay}$ transactions of the all payment channels. Therefore no withdrawal can be done by any user of the GRE protocol of this configuration until $U_0$ is comfortable starting the process (coinciding with its release of the final secret value $sv_{final} = k_s + k_1 + k_2 + \ldots + k_{n-1} + k_0$, which includes the value of $k_s$).

The final payment channel $U_{n-1} \rightarrow U_0$ is finalised at or before time S. The set of payment channels connecting the users can be visualised as a circle as shown in FIG. 16, which shows a representation of the $U_i \rightarrow U_{(i+1) mod\ n}$ payment channels existing between all users of the protocol of this configuration. Arrows signify the payment channels and direction of $T_{Pay}$ payment. Values externally adjacent the arrows represent the secret value required for the transaction $T_{Pay}$: $U_i \rightarrow U_{(i+1) mod\ n}$ to be accepted by the blockchain. Values internally adjacent the arrows represent the s time span values. The $Q_i$ values represent the encrypted value of the payment channel's secret value.

In light of the circular arrangement, the fact that the order of $\{U_i | I \in [0, n-1]\}$ was random means that the user who pays a user $U_i$ is random and the user who $U_i$ pays is random. Likewise the user who pays a user $U_i$ is different from the user who $U_i$ pays.

The initiator $U_0$ spends the transaction $T_{Pay}$ of the existing payment channel $U_{n-1} \rightarrow U_0$, revealing the value of $sv_{final} = k_s + k_1 + k_2 + \ldots + k_{n-1} + k_0$. As described above, it was $U_0$ who created the values $k_s$ and $k_0$, and all users were required to send their $k_i$ values to $U_0$.

$U_0$ can communicate this value of $sv_{final}$ directly to $U_{n-1}$, or this value may be retrieved from the blockchain.

Although $U_{n-1}$ now knows $sv_{final}$, this is not the secret value needed for $U_{n-1}$ to receive payment via the payment channel $U_{n-2} \to U_{n-1}$:

$$sv_{final} = k_s + k_1 + k_2 + \ldots + k_{n-1} + k_0, \text{ whereas:}$$

$$sv_{n-1} = k_s + k_1 + k_2 + \ldots + k_{n-1}.$$

However, $U_{n-1}$ may easily calculate $sv_{n-1}$ by subtracting $k_0$ from $sv_{final}$, then submit the $T_{Pay}$ transaction for their payment. $U_{n-1}$ would have known $k_0$ from previous processes in constructing the payment channel transactions.

Similarly each user $U_{(i+1) \bmod n}$ may directly communicate the value $sv_{(i+1) \bmod n}$ to its payer $U_i$. If $U_{(i+1) \bmod n}$ does not, user $U_i$ may retrieve the value $sv_{(i+1) \bmod n}$ in the blockchain ledger (within at least time s).

From $sv_{(i+1) \bmod n}$, user $U_i$ can calculate $sv_i$ by subtracting $k(i+1) \bmod n$ from $sv_{(i+1) \bmod n}$. This allows $U_i$ to be paid via $T_{Pay}$: $U_{i-1} \to U_i$.

As the blockchain takes on average 10 minutes to confirm a transaction, the value of s should be chosen such that the time period it represents is sufficient for any user $U_i$ to find if necessary, within that time period, the value of $sv_{(i+1) \bmod n}$ in a transaction $T_{Pay}$: $U_i \to U_{(i+1) \bmod n}$, after said transaction is submitted to the Bitcoin network. If the average time to confirm a transaction changes, then s can be chosen accordingly.

The value of s should also include an estimated time for the construction of the payment channel between a pair of users. Therefore s would be $s = s_{sv} + \varepsilon$ where $s_{sv}$ is the estimated time to find $sv_{(i+1) \bmod n}$ and submit $T_{Pay}$: $U_i \to U_{(i+1) \bmod n}$, and $\varepsilon$ is the estimated time to construct the payment channel.

Figure 17:
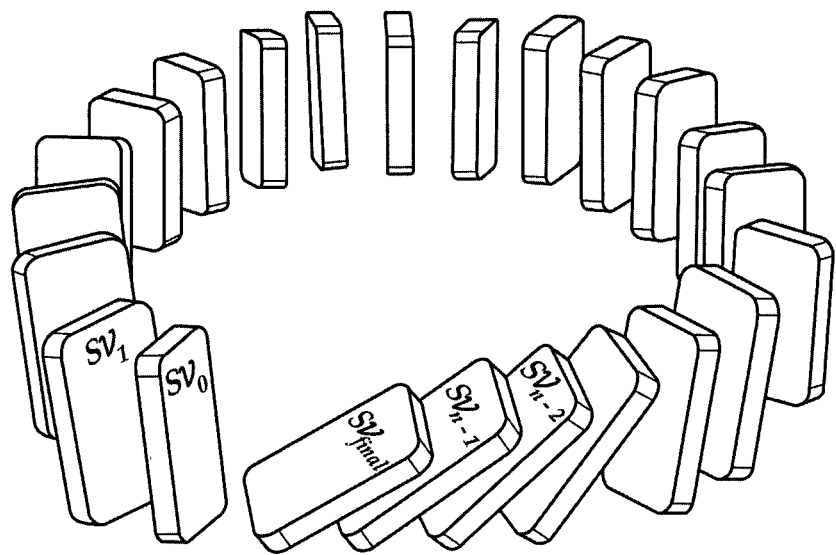
FIG. 17 shows a representation of execution of a chain of payment channels of the second embodiment.

Due to the initiator $U_0$ having submitted to the network the $T_{Pay}$ transaction of the existing payment channel between $U_{n-1}$ and $U_0$, revealing the value of $sv_{final}$ to $U_{n-1}$, the value of $sv_i$ can then be revealed to every other user $U_i$ in an anticlockwise way (from $U_{n-1}$ to $U_1$): see FIG. 17. This is based on the premise that each user, $U_i$, will be invested in submitting the transaction ($T_{Pay}$ of the payment channel $U_{i-1}$ to $U_i$) that allows themselves to get paid.

User $U_i$ submitting said transaction will require obtaining the value of $sv_{(i+1) \bmod n}$ from $T_{Pay}$ of the payment channel $U_i$ to $U_{(i+1) \bmod n}$ from which $U_i$ would derive $sv_i$. Through $U_i$ submitting that transaction $T_{Pay}$ of the payment channel to $U_{i-1}$ to $U_i$, the value of $sv_i$ is then made available to user $U_{i-1}$ who then derives $sv_{i-1}$. This process cascades like dominoes falling all the way from $U_{n-1}$ to $U_1$ in such a way that each user $U_1$ cashing in reveals the $sv_{i-1}$ to user $U_{i-1}$, allowing the user $U_{i-1}$ to also cash in.

More formally, the sequence of $T_{Pay}$ transactions (executed/submitted) of the payment channels occurs as follows:

$$[T_{Pay}: U_{n-1} \to U_0], [T_{Pay}: U_{n-2} \to U_{n-1}], \ldots, [T_{Pay}: U_1 \to U_2], [T_{Pay}: U_0 \to U_1],$$

Completion of the set of $T_{Pay}$ transactions successfully concludes the process. Each user paid x BTC and each user received x BTC.

Figure 18:
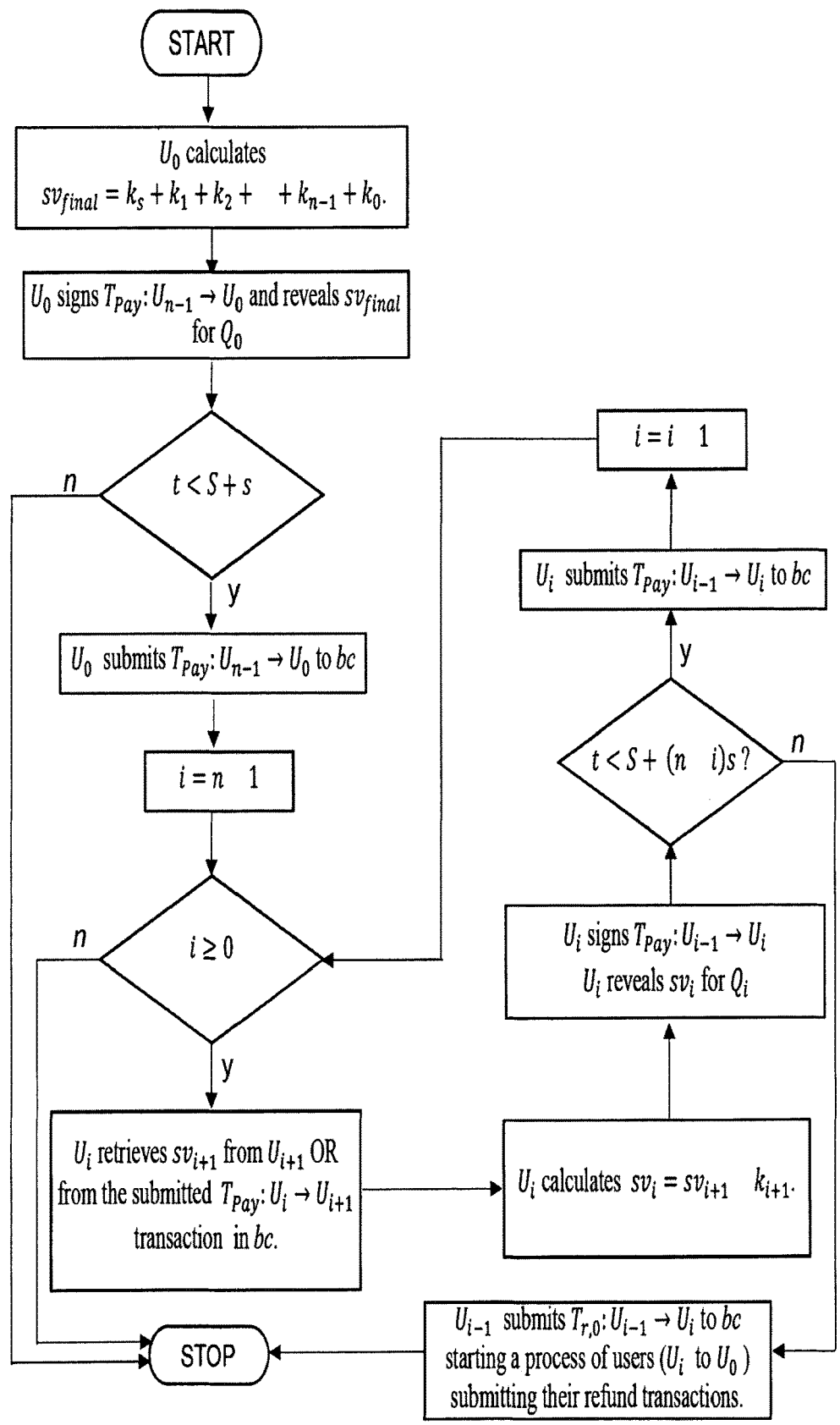
FIG. 18 shows an algorithm for the process of submitting payment transactions of the second embodiment.

The processes of submitting the $T_{Pay}$: $U_i \to U_{(i+1) \bmod n}$ transactions in this configuration are illustrated in FIG. 18, wherein t is current time, PC is payment channel, $U_{i+1} = U_{(i+1) \bmod n}$, and be is blockchain. For payment channel $U_{n-1} \to U_0$, the sv value is named $sv_{final}$.

The submission of all refund transactions, $T_{r,0}$, to the blockchain is restricted by the nLockTime value. This value of the nLockTime parameter represents an absolute time value such that $T_{r,0}$ will only be accepted by the blockchain at or after that time. The nLocktime value for $U_i \to U_{(i+1) \bmod n}$ is $S + (n-i)s$.

A user $U_i$ submits $T_{r,0}$: $U_i \to U_{(i+1) \bmod n}$ if $U_{(i+1) \bmod n}$ fails to sign and reveal $sv_{(i+1) \bmod n}$ for $Q_{(i+1) \bmod n}$ before the nLocktime value.

If $U_i$ submits $T_{r,0}$: $U_i \to U_{(i+1) \bmod n}$ this means that the payment transaction $T_{Pay}$: $U_i \to U_{(i+1) \bmod n}$ has not been and will never be executed. This means that $sv_{(i+1) \bmod n}$ will not revealed and thus $U_{i-1}$ will not be able to calculate, from the blockchain, the $sv_i$ necessary for the payment transaction $T_{Pay}$: $U_{i-1} \to U_i$.

$U_{i-1}$ will have to wait till at or after the nLockTime value for $U_{i-1} \to U_i$ before submitting his refund transaction $T_{r,0}$: $U_{i-1} \to U_i$.

Figure 19:
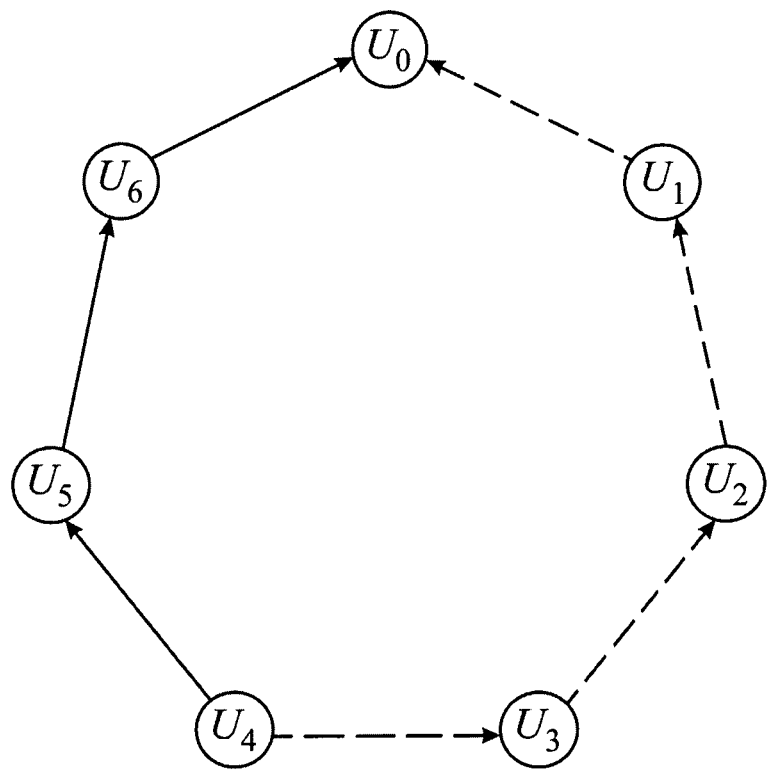
FIG. 19 illustrates a chain of payment channels of the second embodiment including refund transactions.

These refund submission processes are repeated, in an anticlockwise manner, for all users up to and including the initiator $U_0$ who submits $T_{r,0}$: $U_0 \to U_1$. Each of these transactions can only occur at or after a specific point in time. An example of this sequence of refund transactions is shown in FIG. 19, wherein $U_4$ fails to sign and produce $sv_4$ for $T_{Pay}$: $U_3 \to U_4$ before t=S+4s. Refund transactions are represented by arrows pointing anticlockwise. Payment, or execution, transactions are represented by arrows pointing clockwise.

Figure 20:
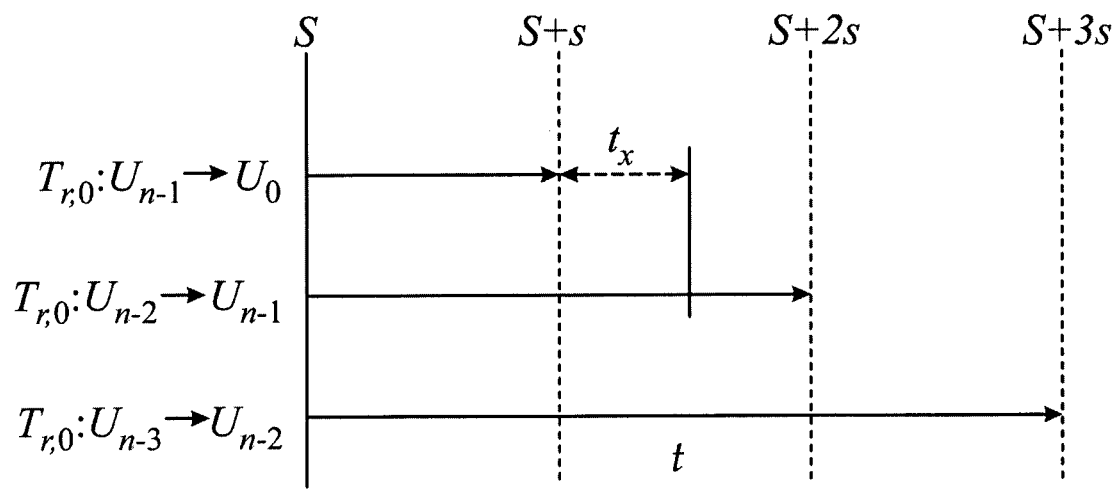
FIG. 20 illustrates locktime requirements for refund transactions of the second embodiment.

It is important to note that a refund transaction does not have to be submitted at the exact nLockTime value. It can be applied at that time or after. This means that while $U_i$ may grant $U_{(i+1) \bmod n}$ extra time, $t_x$, to sign and produce $sv_{(i+1) \bmod n}$ for $T_{Pay}$: $U_i \to U_{(i+1) \bmod n}$ this would mean that $U_i$ would consequently have less time to produce $sv_i$ for $T_{Pay}$: $U_{i-1} \to U_i$ (assuming $U_i$ is not granted extra time by $U_{i-1}$). See FIG. 20, wherein $U_0$, given extra time $t_x$, leads to $U_{n-1}$ having less time to calculate $sv_{n-1}$ and submit $T_{Pay}$: $U_{n-2} \to U_{n-1}$ to the blockchain due to $U_0$'s late submission of $T_{Pay}$: $U_{n-1} \to U_0$.

Below, a description is given of the construction of the Bitcoin transactions utilised in the payment channel $U_i \to U_{(i+1) \bmod n}$ between a pair of users of the protocol of this configuration. These payment channels are composed of three main transactions:

Deposit into 2-of-2 multisignature Transaction $T_c$: This transaction represents the commitment component of the payment channel, and may be referred to as a commitment transaction. Here, through the transaction, user $U_i$ sends/commits a specified number of bitcoins, x BTC, to be governed by either:
 a 2-of-2 multisignature $U_{(i+1) \bmod n}$)
 OR
 knowledge of a value $sv_{(i+1) \bmod n}$ AND the signature of $U_{(i+1) \bmod n}$;

Refund Transaction $T_{r,0}$: This transaction represents the refund of x BTC (from the commitment transaction) back to user $U_i$ that becomes eligible for submission to the blockchain after a specified time has expired. For this transaction to be executed successfully it requires the signatures of users $U_i$ AND $U_{(i+1) \bmod n}$; and Payment Transaction $T_{Pay}$: This transaction is the payment of x BTC from $U_i$'s committed funds to user $U_{(i+1) \bmod n}$. For this transaction to be executed successfully it requires the knowledge of a secret value $sv_{(i+1) \bmod n}$ and the signature of the user $U_{(i+1) \bmod n}$. Payment transactions may also be referred to as execution transactions.

Note that the details of the transactions of FIGS. 21 to 24 are limited to the <scriptSig>, <scriptPubkey>, nLockTime, and output values of the various transactions, as these are the transaction elements most relevant to this configuration.

The transaction details are shown in FIGS. 21 to 24. Below, details of an Elliptic Curve opcode are described.

This configuration uses Elliptic Curve encryption. Given a secret value k, its EC encrypted value is Q=kG; where G is a base point on the Elliptic Curve.

This EC encryption serves as an equivalent of the hash function of the GRE of the configuration using the same secret value in all payment channels. However, the homomorphic-like property of EC addition enables a changing sv value in the payment channels of this configuration, while enabling the domino cascade of secret values starting with the reveal of the final version of sv, $sv_{final}$.

For each payment channel $U_i \rightarrow U_{(i+1) mod\ n}$ the commitment transaction $T_c$ includes a condition that stipulates that, apart from the refund, the committed funds can only be spent if the secret value $sv_{(i+1) mod\ n}$ is presented that produces the encrypted value $Q_{(i+1) mod\ n}$. This non-refund spending of committed funds is to be done by the $T_{Pay}$ of the payment channel.

$$Q_{(i+1) mod\ n} = sv_{(i+1) mod\ n} G$$

Where $sv_{(i+1) mod\ n} = k_s + k_1 + k_2 + \ldots k_i + k_{(i+1) mod\ n}$

To determine if $sv_{(i+1) mod\ n}$ is correct the following EC opcode is employed, which provides for the multiplication Q=kG. This opcode is called OP_ECPMULT. OP_ECPMULT takes an encoded Elliptic Curve Point and a number and performs Elliptic Curve Multiplication by Scalar. It outputs the result as an encoded Elliptic Curve Point.

The scripts of the transactions $T_c$, $T_{r,0}$, and $T_{Pay}$ of the payment channel $U_i \rightarrow U_{(i+1) mod\ n}$ are shown in FIGS. 21 to 24. In particular, FIG. 24 shows how the <scriptPubKey> of the commitment transaction $T_c$ is combined with the <scriptSig> of the payment transaction $T_{Pay}$, using the above-described opcode OP_ECPMULT, to unlock the committed x BTC.

Configurations of the present invention have been described above as using either the same secret value for all payment channels or different secret values for all payment channels, though it is within the remit of the skilled person to combine the configurations so as to use a combination of changing secret values and unchanging secret values.

Furthermore, it is to be understood that other communication channels, such as email, file transfer protocol, and peer-to-peer sharing may be used to communicate information by users of any configuration of the present invention, and that this information may relate to secret values or information relating thereto, details of one or more transactions, and complete or incomplete versions of one or more transactions themselves, and that the extent to which communication channels other than the Blockchain are used may depend on the level of trust existing between given pairs of users of the present invention.

It is to be understood that, while the configurations of the present invention described above refer only to the transfer of Bitcoins between users, that users may instead exchange other resources using the protocol, such as information, contracts, and tokens. A token represents an asset or resource according to a smart contract associated with the token, such that control of the token affords control of the asset or resource. The smart contract itself may be stored off-blockchain, or it may be stored inside one or more transactions.

Herein, the term "system" is used to encompass a system of computer hardware and/or software configured to carry out steps of at least one configuration of the GRE protocol described above, the protocol itself, and the protocol saved on computer hardware.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system comprising:
one or more processors; and
memory storing computer-executable instructions that, if executed, cause the one or more processors to construct a transaction channel for performing transaction mixing between a plurality of users on a blockchain by at least carrying out the steps of:
  (i) preparing a first commitment transaction arranged to transmit control of a resource from a source address of a first user to a receiving address of a second user;
  (ii) preparing a second commitment transaction different to the first commitment transaction arranged to transmit control of a resource from a source address of the second user to a receiving address of a further user, wherein the second payment channel is prepared after the first payment channel;
  (iii) preparing a further commitment transaction different to the first and second commitment transactions arranged to transmit control of a resource from a source address of the further user to either:
    (a) a receiving address of the first user; or
    (b) a receiving address of a yet further user and repeating step (iii) until option (a) is performed to complete a transaction chain, wherein the further payment channel is prepared after the second payment channel; and
  (iv) executing the transaction chain in a reverse order to an order that the transaction chain is prepared, wherein:
  a value of k selected by the first user is revealed to the remaining users in the reverse order such that payment transactions of the respective payment channels are submitted to the blockchain in the reverse order;
  the value of k is revealed by the first user to the further user or yet further user by direct communication or by retrieval from the blockchain;
  the value k is revealed to a next user in the reverse order by retrieval from the blockchain of an immediately previously submitted payment transaction according to the reverse order; and the second, further, and yet further user are selected at random from the plurality of users.

2. The system of claim 1, wherein at least one commitment transaction is arranged to transmit control of a respective resource responsive to satisfaction of an execution condition of the at least one commitment transaction.

3. The system of claim 2, further configured to carry out the step of preparing at least one execution transaction arranged to satisfy a respective execution condition.

4. The system of claim 2, wherein the execution condition of the at least one commitment transaction comprises supply of a respective secret value.

5. The system of claim 4, wherein at least one secret value is to be chosen by the first user, and wherein at least one execution condition comprises supply of the chosen secret value.

6. The system of claim 5, wherein at least one secret value is calculable responsive to at least one of: (i) supply of the chosen secret value; and (ii) supply of at least one other secret value.

7. The system of claim 1, wherein at least one commitment transaction is arranged to return control of a respective resource to a respective user upon satisfaction of a return condition.

8. The system of claim 7, further configured to carry out the step of preparing at least one return transaction comprising a locktime, the at least one return transaction arranged to satisfy at least one respective return condition upon expiry of the locktime.

9. The system of claim 1, further configured to submit to a blockchain at least one prepared transaction.

10. The system of claim 1, further configured to execute the transaction chain in an order reverse to the order in which the transaction chain is prepared.

11. The system of claim 1, wherein the resource from the source address of the first user, the resource from the source address of the second user, and the resource from the source address of the further user are identical to one another.

* * * * *